(12) United States Patent
Milani et al.

(10) Patent No.: US 7,060,311 B1
(45) Date of Patent: Jun. 13, 2006

(54) METHOD FOR PACKAGING A COMPOSITE FOOD PORTION

(75) Inventors: Franco X. Milani, Green Bay, WI (US); Susan Frinak, Green Bay, WI (US); Donn S. Theuerkauf, Appleton, WI (US); Francis J. Parker, Green Bay, WI (US); Robert Olsen, Tempe, AZ (US); Daniel P. Shannon, Green Bay, WI (US); David L. Shaft, Green Bay, WI (US)

(73) Assignee: Schreiber Foods, Inc., Green Bay, WI (US)

( * ) Notice: Subject to any disclaimer, the term of this patent is extended or adjusted under 35 U.S.C. 154(b) by 382 days.

(21) Appl. No.: 09/609,016

(22) Filed: Jun. 30, 2000

(51) Int. Cl.
  *B65B 25/06* (2006.01)
  *A23L 1/38* (2006.01)

(52) U.S. Cl. ................ 426/414; 426/410; 426/633; 426/90; 426/106

(58) Field of Classification Search ............ 426/90, 426/106, 115, 414, 410, 633
See application file for complete search history.

(56) References Cited

U.S. PATENT DOCUMENTS 3,044,883 A * 7/1962 Ferguson, Jr. ............ 426/93
3,117,871 A * 1/1964 Bahr et al. ................ 426/633

(Continued)

FOREIGN PATENT DOCUMENTS

| CA | 2233097 | 3/1998 |
| CA | 2291292 | 11/1999 |
| CA | 2291292 | 6/2000 |
| DE | PCT/EP99/06252 | 8/1999 |
| EP | 0 904 703 A2 | 3/1999 |
| EP | 1088487 A2 | 4/2001 |
| JP | 57036134 | 8/1982 |
| JP | 61-282044 | 12/1986 |
| WO | WO 98/47390 | 10/1998 |
| WO | WO 01/05248 A1 | 1/2001 |

OTHER PUBLICATIONS

Sworn et al., "Gellan Fluid Gels", Sep. 1994, From *Food Hydrocolloids* vol. 9 No. 4 pp 265–271, 1995.
Bourne, Malcolm C., "Texture Profile Analysis", of *Food Technology* pp. 62–67, Jul. 1978.
Szczesniak, A.S., "Texture: Is it Still an Overlooked Food Attribute?", from *Food Technology*, pp. 85–95, Sep. 1990.
Falkenstein, Gary, "Co–Extrusions", from *Packaging's Encyclopedia 1989*, pp. 16–18.
McCormick, Richard D., "Formed Peanut Butter Slice—Process Development Seeks A Product", from Food Product Development, vol. 9, No 9, Nov. 1975.
Smucker Competes in Ready–To–Eat Luch Segment, from *Food Institute Report* of May 8, 2000.
Gillham, Omer, ". . . sliced peanut butter", taken from tulsaworld.com.

*Primary Examiner*—Steve Weinstein
(74) *Attorney, Agent, or Firm*—Brinks Hofer Gilson & Lione

(57) ABSTRACT

Packaged food portions, such as food slices, consisting of two or more food items, such as peanut butter and jelly, and processes for making them. The food portion is provided with sufficient viscosity and textural properties to enable its formation into a cohesive mass which can be extruded while maintaining the individual identity and organoleptic attributes of each food item within the food portion. The food portion may be shaped into a slice or other configuration prior to or during its encasing within a flexible packaging material. Product formulations which provide for minimal moisture migration between the different food items within the food portion and for optimum product stability, as well as processes and methods for providing and processing these formulations, are also disclosed.

58 Claims, 15 Drawing Sheets

U.S. PATENT DOCUMENTS

| | | | |
|---|---|---|---|
| 3,278,314 A | 10/1966 | Colby et al. | |
| 3,509,920 A | * 5/1970 | Word | 141/100 |
| 3,552,980 A | 1/1971 | Cooper et al. | |
| 3,559,700 A | * 2/1971 | Erickson | 141/9 |
| 3,582,358 A | 6/1971 | Bundus | |
| 3,615,591 A | 10/1971 | Newlin et al. | |
| 3,615,645 A | 10/1971 | Forkner | |
| 3,690,898 A | * 9/1972 | Partyka | 426/275 |
| 3,969,514 A | 7/1976 | Tiemstra | |
| 3,969,536 A | 7/1976 | Ikeda et al. | |
| 3,978,246 A | * 8/1976 | Chozianin et al. | 426/633 |
| 4,000,324 A | 12/1976 | Horn | |
| 4,015,644 A | * 4/1977 | Kinney | 141/9 |
| 4,089,981 A | 5/1978 | Richardson | |
| 4,112,800 A | 9/1978 | Cole et al. | |
| 4,356,202 A | 10/1982 | Todd | |
| 4,369,885 A | * 1/1983 | Redmond | 206/484 |
| 4,423,083 A | 12/1983 | Shenouda | |
| 4,465,702 A | 8/1984 | Eastman et al. | |
| 4,517,203 A | 5/1985 | Levine et al. | |
| 4,567,055 A | 1/1986 | Moore | |
| 4,661,360 A | 4/1987 | Smith | |
| 4,666,723 A | 5/1987 | Invernizzi et al. | |
| 4,738,074 A | 4/1988 | Invernizzi et al. | |
| 4,792,457 A | 12/1988 | Brna et al. | |
| 4,858,524 A | 8/1989 | Simelunas et al. | |
| 5,034,242 A | 7/1991 | Lasdon et al. | |
| 5,037,664 A | 8/1991 | Kyogoku et al. | |
| 5,038,550 A | * 8/1991 | Wirsig et al. | 53/451 |
| 5,063,073 A | 11/1991 | Kratochvil | |
| 5,417,990 A | 5/1995 | Soedjak et al. | |
| 5,440,860 A | 8/1995 | Meli et al. | |
| 5,518,745 A | 5/1996 | Thota et al. | |
| 5,527,551 A | * 6/1996 | Fager et al. | 426/515 |
| 5,532,018 A | 7/1996 | Miller et al. | |
| 5,567,454 A | 10/1996 | Bogdan | |
| 5,639,494 A | 6/1997 | Grassin et al. | |
| 5,766,662 A | 6/1998 | Inglett | |
| 5,783,241 A | 7/1998 | Bocabeille et al. | |
| 5,853,778 A | * 12/1998 | Mayfield | 426/89 |
| 5,855,939 A | 1/1999 | Bogdan | |
| 5,858,426 A | 1/1999 | Bienvenu | |
| 5,869,117 A | 2/1999 | Neufeld et al. | |
| 6,058,680 A | 5/2000 | Meli et al. | |
| 6,199,346 B1 | 3/2001 | Ahad et al. | |

* cited by examiner

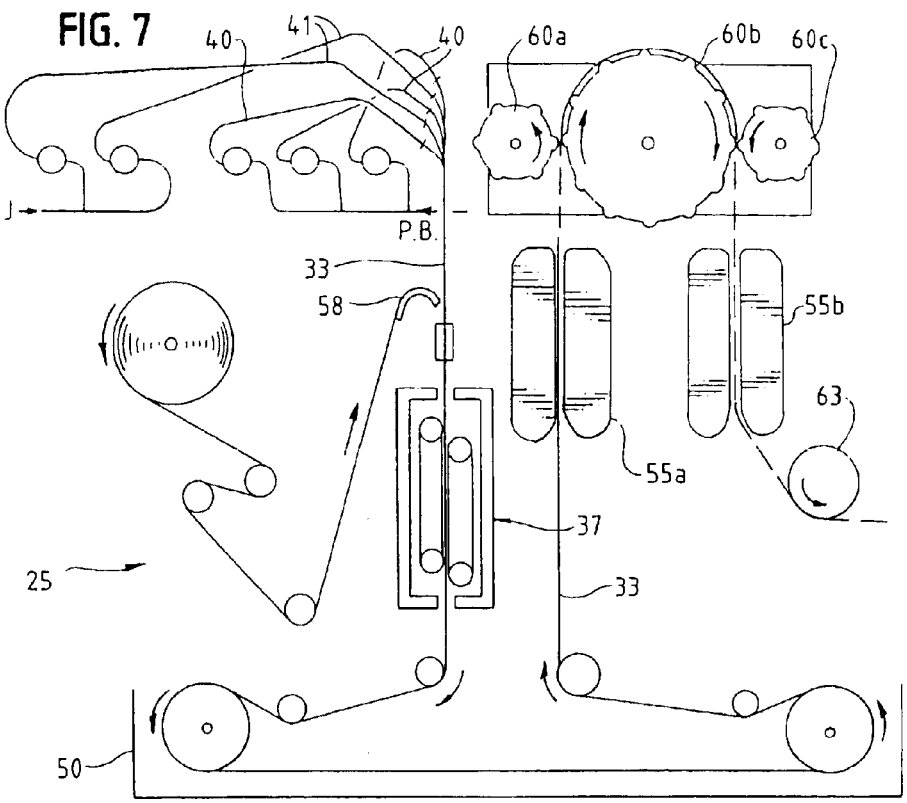

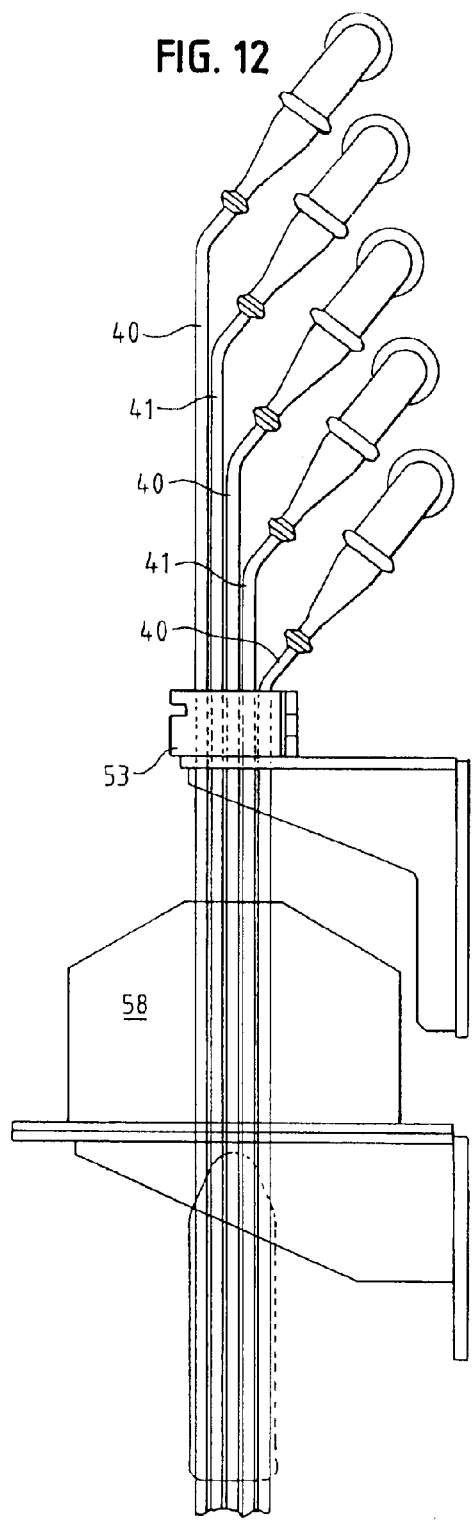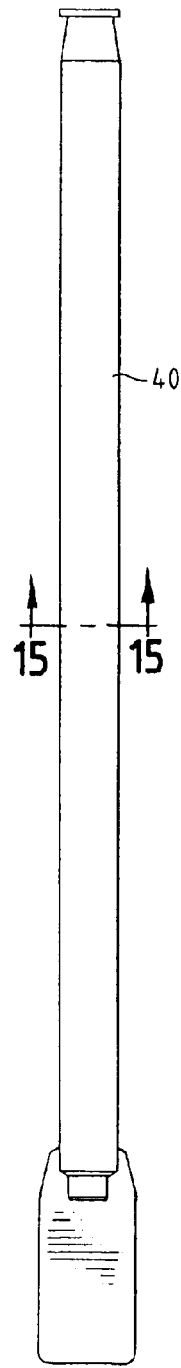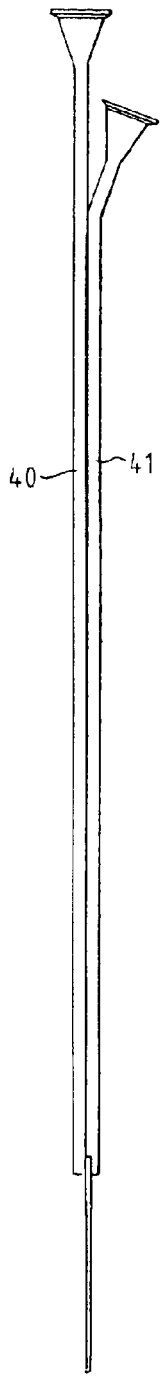

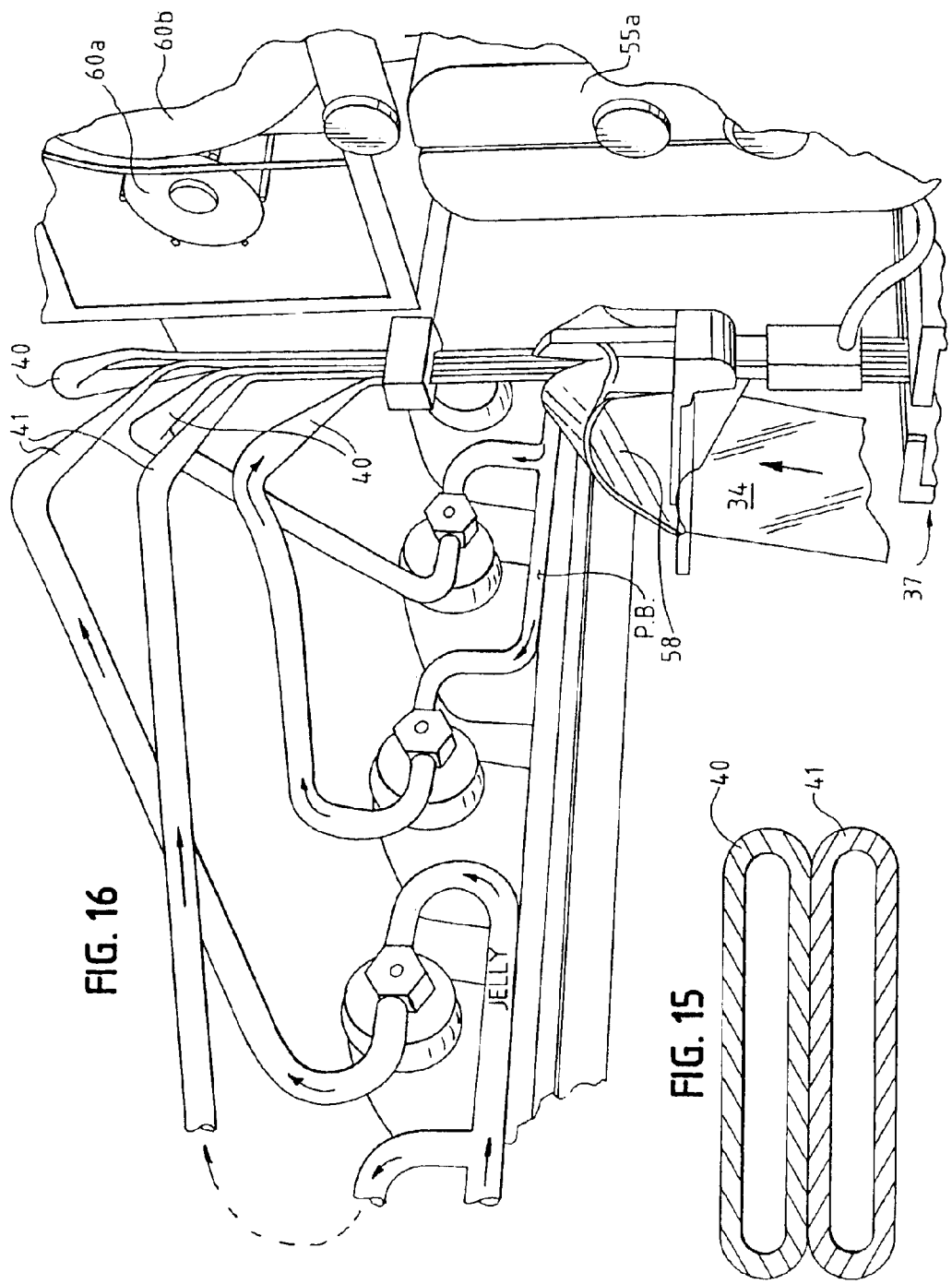

METHOD FOR PACKAGING A COMPOSITE FOOD PORTION

BACKGROUND OF THE INVENTION

The invention generally relates to a food slice and processes for making and packaging it. More specifically, the invention provides a food slice consisting of two or more food items, such as nut butter and jelly, and a method for making and packaging the food slice.

The food industry has seen a large number of new products over the last few decades. Many of these products take traditional foods and place them in a variety of package formations. The package formation may facilitate convenient storage and handling, ease of use and application, or portability and portion control.

Attempts have been made, for example, to develop food products and packaging configurations that combine foods that are customarily combined and consumed by the consumer. Examples include peanut butter and jelly, chocolate and marshmallow, or catsup and mayonnaise. While products such as these are manually mixed and enjoyed by the consumer, precombining these products into a single food product is highly desirable from a marketing and consumer time savings standpoint. Yet it presents many problems, including processing, product stability, moisture migration, and color stability. A variety of formulations known as peanut butter and jelly are consumed when spread on bread or toasted bread. The current majority of peanut butters and jellies are packaged in jars and are portioned with either knives or spoons onto bread. Peanut butter, in combination with the sweetness and flavor of a grape jelly, for example, makes a simple, inexpensive topping or sandwich when used upon a grain-based bakery item such as crackers or bread, and presents itself as an attractive folk recipe. It will also be appreciated that the science of sensory evaluation of mastication and the expectation of flavors, texture, and sensation demands that the peanut butter and jelly remain relatively unmixed within the sandwich until consumed.

Examples of precombined products and package formulations are described in U.S. Pat. No. 3,772,038 to Ayres; U.S. Pat. No. 5,312,641 to Castillo; and U.S. Pat. Nos. 5,567,454 and 5,855,939 to Bogdan; Canadian patent application CA 2233097 to Chenn; and an article, Food Product Development, McCormick, R. D. Vol. 9:9, pages 11,12, 14 (1975) ("FPD article"). This literature discloses peanut butter, or peanut butter and jelly, in a slice form. However, the inventors are not aware of commercially available packaged food slices consisting of a single cohesive mass of two or more food slice items, such as peanut butter and jelly, or such food slices that are made using continuous, high-speed processes or that provide convenience, portion control, and similar sensory characteristics to those of the traditionally consumed, manually-combined counterpart food items.

Providing a combined food product that can be processed in a high speed, commercially viable manner is difficult. While creating layers of food material on a bench-top offers a myriad of possibilities because of very few demands on quality or performance, providing commercially successful product formulas and processes are much more demanding. Commercial-scale equipment requires ingredients that are cohesive yet pumpable. Equipment of this nature runs continuously which disallows processes requiring long firming or body modification times.

Further, folk recipes rarely require a shelf life of greater than a day, so that shelf life and the detrimental effects of storage for products consisting of two or more food items which are manually combined by the consumer are rarely considered. But it is readily apparent to persons with ordinary skill in this food processing art that a shelf life of many months, such as 3–6 months or more, at refrigerated temperatures is desired in order to meet retail distribution requirements. However, it is also known that combining two food items having dissimilar moisture contents will cause the water to migrate from the food item with higher moisture to the food item with lower moisture. Water migration, in the specific case of jelly next to peanut butter, for example, causes darkening and a noticeable flavor change within the peanut butter.

Attempts have been made to deal with the water migration problem. For example, U.S. Pat. No. 3,969,514 to Tiemstra describes precombined products, such as a nut spread and a jelly or jam, in which an adjustment is made to the water activity of one of the food items to increase the time period in which the food items are maintained as separate and discrete. U.S. Pat. No. 3,552,980 to Cooper describes a hydrophilic spread such as peanut butter which is packaged in contact with a sweet aqueous spread that is similar to jelly. The sweet aqueous spread is modified with a non-aqueous edible liquid viscosity reducing agent such as glycerin to enable the products to remain stable with reduced moisture migration overtime. Both the Tiemstra and Cooper patents disclose food items packaged in jarred containers.

Oxidation of the peanut oil in peanut butter is also a problem, causing the peanut butter to deteriorate and decreasing its shelf life.

Accordingly, it is an object of the present invention to provide a food slice consisting of a single cohesive mass of two or more food items, such as peanut butter and jelly, which may be wrapped in a packaging film, sealed and produced on a commercial scale.

It is another object of the invention to provide commercially viable, high speed, continuous processing methods for making and packaging food portions, including individually wrapped food slices. A related goal is to ensure that the food portion is on the one hand cohesive, while on the other hand pumpable and extrudable. It is particularly desirable that the invention be compatible with high speed, continuous processing equipment such as individual wrap slice machines described in U.S. Pat. Nos. 5,440,860 and 5,347,792 to Meli, for example. Those knowledgeable in the art will realize that this machinery described in these patents, suitably modified as described below, as well as other similar processing equipment, may be used for the production and packaging of food portions consisted of combined food items according to the present invention.

It is yet another object to provide such food portions in a variety of configurations, such as bi- or tri-laminates, stripes, variegated, or other shapes encased in flexible packaging materials.

It is a further object to provide a food product that combines two or more different food items, such as peanut butter and jelly, in a simple package that provides portion control, allows easy removal from the package, and dispenses with the need to use a utensil for manually combining or spreading the food items. Preferably a packaged slice would be provided that permits complete manual release from its flexible packaging material and that is integral enough to allow for some manipulation before consumption.

It is still another object to provide a convenient, single cohesive mass of food product that combines two or more different food items, while enabling the food product to be manually removed from its wrapper and held, manipulated, eaten or applied elsewhere using only the fingers, and without the product disintegrating or deteriorating in an unusable or unsightly manner. A related goal is to provide a combined food product with organoleptic and textural semblance to its traditional manually-combined counterpart.

It is yet another object to manipulate component viscosity through composition, shear, and temperature to prevent excessive mixing and commingling of multiple components during processing.

Still a further object is to provide a high barrier film to minimize oxygen migration and subsequent product degradation during packaged storage.

Another object, in order to maximize shelf life of the combined, conformed food product, is to modify water activity to achieve maximum stability of the food components during packaged storage.

Definition of Claim Terms

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Acidulants" means food acidulants, including food grade acids such as citric acid. "Co-extrusion" means pushing two or more food products through one or more different orifices at roughly the same time.

"Conformed" means two or more food product streams that are coextruded and shaped within a flexible packaging material into a food portion.

"Extrusion" means pushing a product through an orifice.

"Food portion" means any food product, regardless of size, shape or configuration, including bricks, chunks, loaves, bars, slices, etc.

"Fruit juice" means fruit juice, fruit juice concentrate, dried fruit juice, or reconstituted forms thereof.

"Gel" or "gelling agent" means substances that qualify as gels as that term is normally used in the art of food science, and refers to a colloid in a form more solid than a sol.

"Hardness" means the Texture Profile Analysis test of plunging a cylinder into the food product and measuring the maximal force achieved during elastic compression to just before failure of the food item as determined by gel disruption.

"Jelly" means gelled food products including all types of jellies, fruit spreads, jams, preserves, marmalades, fruit butters, dessert gels, gelatin slices, and the like. "Jelly" may be made from sugars, pectins, gelatin, gelling agents and/or acidulants. "Jelly" may be flavored from the juice of fruits, concentrated fruit juice, natural flavor, artificial flavor or any combination of those flavors. The extract or puree of any food source may also be used in "jelly" to impart both function and flavor. "Jelly" is not limited as defined within the U.S. Code of Federal Regulations, §§ 21:150.140, 21:150.160.

"Maintaining individual product identity" means two or more different food items provide together in the same package and present in discreet phases such that each of the separate food items may be visually discerned at the surface of the food portion by the consumer.

"Nut butter" means any food product made from nut solids and vegetable fats plus other ingredients such as stabilizers, flavorants, flavor enhancers, bulking agents, emulsifiers, and sweeteners. "Nut butter" also includes items termed "peanut butter", such as food items prepared from clean, sound, shelled peanuts by grinding roasted, mature peanut kernels from which the seed coats have been removed, and to which sugar, dextrose, and/or salt may be added to enhance the flavor, and to which hydrogenated vegetable oils may be added to prevent oil separation and to promote consistency. "Nut butter" is not limited to any definitions for "nut butter" or "nut spread" or "peanut butter" as defined within the U.S. Code of Federal Regulations, § 21:164.150.

"Organoleptic attributes" mean the tactile, olfaction and gustation qualities of a food, as identified in the field and science of measuring human response to foods.

"Package" means any encapsulation or covering for a food product.

"Peanut flour" means a food item prepared from raw shelled peanuts that have been cleaned, blanched and sorted to remove any damaged or discolored nuts along with any foreign materials. The nuts are then roasted and hydraulically pressed to remove some of the peanut oil content. The product is then crushed and milled to a desired fineness.

"Set" means for a gelled product to reach a substantially constant viscosity.

"Slice" means a food product having an area/height ratio of greater than 20:1.

"Sugar" means any sugar, as well as any sugar syrup, including any carbohydrate-derived mixture including mono-, di-, and higher saccharides either in their naturally occurring state or derived by hydrolysis, and including mixtures containing sufficient water to be present in a liquid or fluid state.

"Texture" means the physical sensation of a food product as it interacts with the human senses, including its appearance and its mouth-feel upon mastication.

"Thickeners" mean constituents for increasing the viscosity of a food product, including gelling and non-gelling agents, such as proteins, polysaccharides and hydrocolloids.

"Water activity" means the ratio of partial vapor pressure of water, measured above the food item in question, to the vapor pressure of pure water at a given temperature.

SUMMARY OF THE INVENTION

The objects mentioned above, as well as other objects, are solved by the present invention, which overcomes disadvantages of prior art precombined food products and processes for making and packaging them, while providing new advantages not previously obtainable with such food products and processes.

The present invention solves many attendant problems arising from attempts at precombining two or more different food items into a single food product, including problems relating to continuous processing, rheologic criteria, shelf stability, removal of the food item from the package, and consumer expectations relative to the traditional products and their use.

This invention has its genesis in two surprising findings. The first involves fruit jelly formation. Many trials were carried out in which a fruit gel was found not firm enough to prevent mixing with the peanut butter during extrusion. The typical problem experienced was that as concentrations of a carbohydrate sweetener were increased to build body and thickness, and to lower water activity, the finished product gel tended to be sticky with poor gel formation, even with increased levels of gums. However, it was found that by using corn syrup to disperse the gum without any water addition, a sufficiently firm body was achieved to enable extrusion, with acceptable film separation in the final product. Also, the water activity was lowered significantly.

The second surprising result was discovered when corn syrup was added to peanut butter to increase the water activity of the peanut butter to more closely match that of the jelly. Even mild agitation of the peanut butter and corn syrup mixture caused separation of oil from the product, leaving a solid residue too thick to pump. This may be referred to as an irreversible protein interaction, and particularly became apparent during larger pilot plant scale trials. Surprisingly, it was found that the late addition of the corn syrup material, together with in-line mixing just prior to extrusion provided a smooth-flowing mixture that remained stable throughout processing and packaging.

These two findings were key steps in producing an acceptable, coextruded product suitable for high speed, continuous commercial applications.

An emulsifier was also added into the peanut butter ingredients during mixing and prior to cooking, to add robustness and process tolerance to the mixture, and to provide some delay in the water-induced thickening of the mixture by stabilizing the emulsion.

While formulations and processing steps for peanut butter or peanut butter spread, and jelly or jelly spread, are specifically discussed, the scope of the present invention encompasses other food products which may be combined. These products may range from juice-free jellies and peanut-free butters to foods unrelated to jelly, such as cheese, or a condiment, chocolate and marshmallow, catsup and mayonnaise, etc.

A unique feature of the combined food items of the present invention is the cohesive nature of the formed products. Unlike some prior art products which rely upon jars or containers for handling and support, the cohesive nature of the slice product of the present invention allows it to be handled both within and without the flexible packaging material. Thus, the wrapper can be removed and the product held, manipulated, eaten or applied elsewhere using only the fingers, and without the product disintegrating or deteriorating in an unusable or unsightly manner.

In general, useful jelly formulations for the present invention may be prepared from combinations of juice, juice concentrate, sugar, corn syrup, pectin, gelatin, carrageenan and Konjac flour. Additional sugars such as fructose, glucose, and high fructose corn syrup have been found useful. Vegetable oil may be used to help in release from the packaging film and to reduce foaming during cooking. Starch may also be used to form a gel to provide a stiffer body, also aiding in release of the food product from the film. Some types of pectin and carrageenan are more effective in extrusion performance than others.

Gelatin forms excellent finished product gels but has a tendency to discolor with reducing sugars over time. Gelatin has the characteristic of remaining fluid at high temperatures. Very slow gel formation is then observed as the temperature decreases. Gel formation is often independent of other gelling agents, making it useful in a two-stage gelling system in which a primary gel is followed by a secondary gel. Functionally, gelatin is particularly useful for slice formation, possessing properties of flexibility, elasticity, and clarity.

Peanut butter is a combination of roasted and ground peanuts, sweetener, and stabilizers. Peanut flours are the portion of ground peanuts after part of the oil has been removed. Salt is added for flavor, although it must be of a fine grind or it may have a gritty mouthfeel, particularly in a low moisture product. It has been found that peanut butter combined with peanut flour has a body and texture sufficiently firm for extrusion into slices. In a preferred embodiment of the present invention, when peanut butter is combined with high-moisture jelly, the addition of sugar syrup such as high fructose corn syrup is used to reduce water migration from the jelly to the peanut butter.

In order for jelly to be successfully utilized in an extruded slice preparation, viscosity has to be carefully controlled. This can be achieved by using a two-step gel formation as described in co-pending U.S. Ser. No. 09/356,786, titled "Multi-Stage Thickening Composition For Use With Packaged Food Items And Process For Using Same", incorporated by reference herein in its entirety, as further described below.

In order to produce food products with novel shapes or to introduce multiple streams simultaneously out of the fill head, specialized nozzle devices are provided. For a laminated slice with peanut butter on one side and jelly on the other, with each encompassing the entire surface area on their respective sides, nozzles are expanded and flattened to provide a ribbon-like sheet of material. A set of two nozzles placed side by side provides a laminated ribbon as the material exits the nozzles. To create a striped product configuration, individual fill tubes may be arranged side-by-side with each tube supplying one stripe of the slice.

To create a variegated, e.g., dappled or "polka-dot", product configuration, spheres or nuggets of, e.g., jelly are formed instead of a continuous column or ribbon. The spheres or nuggets are mixed into the peanut butter prior to the slice-forming belt. As the mixture is flattened, the jelly spheres or nuggets take the shape of a disk or dot surrounded in two dimensions by peanut butter. Of course, the opposite configuration is possible, i.e., dots of peanut butter surrounded by jelly.

A purpose of this invention is the incorporation of the above extrusion devices into machines and methods for forming sealed packaged food slices, as described in U.S. Pat. Nos. 5,112,632; 5,440,860; 5,701,724; 6,058,680; 5,347,792; 5,619,844; and 5,800,851, each of which are incorporated herein by reference. With the machine described in the '860 patent, for example, a web of thermoplastic material is first formed into a tubular arrangement with a hermetic longitudinal seal. The plastic material is folded or wrapped and a hermetic seal is formed on the open longitudinal edge of the folded or wrapped web. Additional devices and means are provided to flatten the food mass to form a continuous web. Hermetically sealed cross-seals transverse to the longitudinal forward moving direction of the web are used to portion the slices which are eventually cut into slices. Suitable modifications to the individually wrapped slice equipment described in the '860 Meli patent for beneficial use with the present invention are described below.

Level and speed control devices are also provided to enable continuous production of these multiple food items. Control of material flow supplying any of the nozzle supply lines is important in maintaining a consistent slice appearance. Weight control is also important from a quality, packaging, and cost standpoint. Constant feedback to supply pumps is important as consistency of the food materials may vary, requiring continual adjustments of speeds and pressures. A feedback control device is required to keep supply pumps running at the correct levels.

Another aspect of the invention is the use of high oxygen barrier films, compared to those currently popularly used for packaging process cheese, to limit oxygen permeability and reduce oxidation over time. This reduces subsequent product degradation during packaged storage. In general, all food configurations according to the present invention may share the following characteristics, though these need not be a requirement of the invention: (1) the food slice approximates the size of a slice of bread; (2) each food slice is individually packaged within either a hermetically sealed or non-hermetically sealed flexible packaging material over-wrap; and (3) the food slice requires little effort on the part of the user to separate from the flexible packaging material.

In one preferred embodiment of the present invention, a process is provided for continuously preparing food portions consisting of two or more different food items wrapped in a flexible film. The food items may be separately mixed using ingredients for each of the food items, or the food items may be pre-combined. These food items are separately delivered, such as by pumping, to an extrusion location, and extruded or coextruded and combined into the food portion.

Most preferably, the individual food items within the food portion retain their individual product identity and organoleptic attributes. The jelly, for example, may be completely surrounded or enrobed by the peanut butter, but need not be. If the jelly is not enrobed then, if a tri-laminate slice is provided, for example, in which a jelly slice is surrounded by two nut butter slices, the jelly may only be visible at the edges of the slice.

The food portion may be shaped, such as into a slice configuration, and wrapped within the flexible film. The flexible film may be sealed, such as hermetically sealing the film longitudinally and along cross-seals, to form individual packets of the food portions that are sealed within the packaging film. The individual food items may be provided in laminate, striped, variegated or other forms within the food portion. Preferably, the wrapped food portion has a refrigerated shelf life of greater than about six months.

In one preferred process, the food items may be heated into a soft, molten mass prior to their extrusion, and cooled after their extrusion, though the heating and cooling steps may be omitted given the food item formulations used. When food slices are packaged within flexible film, such that longitudinal and cross seals, whether lap or fin seals, are formed, the cooling step may be performed either before or after cross-sealing. Preferably, the resulting food slices, each containing two or more different food items, are wrapped and hermetically sealed within the flexible film.

The water activity of the food items, such as nut butter and jelly, for example, may be modified in a predetermined manner, such as by the addition of sugar. Preferably, the differential water activity of the nut butter and jelly within the wrapped food slice is less than about 0.5 and, most preferably, is less than about 0.2.

Preferably, the food portions, such as food slices, are sufficiently cohesive to permit removal of the food slice from the sealed wrapper while retaining textural and shape characteristics of the slice. This may be accomplished by adding two-stage thickeners, such as two-stage gels, to the food items. Preferably, the first thickener causes a food item, such as jelly, to have a viscosity of less than about 5,000 centipoise during its extrusion, and the second thickener causes the jelly to have a viscosity of greater than about 100,000 centipoise following extrusion of the jelly and after setting of the second thickener.

Preferred nut butter and jelly formulations have been found particularly useful in the present invention. For example, the nut butter may include, by weight, about 50–90% peanut butter; 1–40% peanut flour; 0.5–5% stabilizer; 0–10% sucrose; and 0–2% salt. Hard fat may be added to the nut butter. The nut component of the nut butter may be created by combining nut flour with an edible oil. In an alternative formulation, the nut butter may include, by weight, about 40–85% peanut butter; 0–10% peanut flour; 0–10% maltodextrin; 0–40% corn syrup; 0.5–5.0% stabilizer; 0.5–4.0% emulsifier; 0.1–3.0% salt; 0–35% fructose; 0–20% dextrose; and 0–40% water.

In a preferred formulation, the jelly may include, by weight, about 5–20% fruit juice; 0.5–5% high methoxyl pectin; 0.5–5% low methoxyl pectin; 0.1–3% acidulants; and 0–2.5% vegetable oil. In an alternative formulation, the jelly may include, by weight, about 5–20% fruit juice; 20–40% corn syrup; 15–35% fructose; 5–20% dextrose; 0.25–4.0% konjac flour; 0.05–2.0% carrageenan; 0.5–4.0% high methoxyl pectin; 0.1–3.0% citric acid; and 0–2.5% vegetable oil.

Shaped extrusion nozzles may be used to provide the food items and food portions with various configurations and shapes. For example, two or more generally planar-shaped extrusion nozzles may be used to provide a laminate food slice. One or more divider plates, which are preferably coated with a substance having a low coefficient of friction, such as Teflon, may be used to maintain separation of the food items immediately following their extrusion. A plurality of extrusion nozzles, carrying alternating food items, may be used to provide food portions with striped food items. Concentric extrusion tubes may be used for extruding the food items in a variegated format.

Using high-speed individual wrap slice machines, such as those disclosed in the Meli '860 or Meli '792 patents, food portions such as food slices may be continuously sealed and wrapped at rates in excess of 300 slices/minute; in excess of 700 slices/minute; and in excess of 1,000 slices/minute.

Sensing mechanisms, such as mass flow meters, transducers and level sensors, may be employed to maintain or regulate weights of each of the two or more food items, so that each of the two or more food items within a food portion may be maintained within predetermined ratios.

In a preferred nut butter and jelly slice configuration, the hardness of the nut butter within the finished food slice is in the range of about 0.254.0 Kg/cm$^2$ at 43° F., and most preferably about 0.5–1.5 Kg/cm$^2$ at 43° F.; the hardness of the jelly within the finished food slice is in the range of about 0.25–4.0 Kg/cm$^2$ at 43° F., and most preferably about 1.0–2.5 Kg/cm$^2$ at 43° F.

A preferred flexible film may include polypropylene having an ethylene vinyl alcohol oxygen barrier layer and one or more sealant layers comprising polypropylene, polyethylene and polybutylene. The flexible film may also include polypropylene and a glycerol monostearate release agent.

A casting process may also be employed for continuously preparing food portions consisting of two or more different food items according to the present invention, in which the food items are wrapped in a flexible film, and maintain their individual product identity and organoleptic attributes. Each of the two or more different food items are first prepared, which may include mixing and cooking steps. The food items are then continuously deposited upon a sanitary surface, which may be covered with a flexible film. The food portions are then wrapped within the flexible film and sealed within the wrapper.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 7 is a schematic view of a preferred individual vertical form and fill [wrap slice] machine for forming food slices according to the present invention, which employs five extrusion lines with different, alternating food items;

FIGS. 8 and 10 are food slices similar to FIGS. 1 and 2, respectively;

FIG. 8a is a cross-sectional view along reference line 8A—8A of FIG. 8;

FIG. 9 is a schematic view of a machine similar to FIG. 7, but with two extrusion lines;

FIG. 11 is a cross-sectional view along reference lines 11—11 of FIG. 10;

FIGS. 12–14 are partial, perspective views of various forms of extrusion tubes according to the present invention;

FIG. 15 is a cross-sectional view along reference line 15—15 of FIG. 13;

FIG. 16 is a partial perspective view of a preferred embodiment of the individual slice wrapping machine and individual product pumps suitable for forming striped slices according to the present invention;

DETAILED DESCRIPTION OF PREFERRED EMBODIMENTS AND BEST MODE

Figure 1:
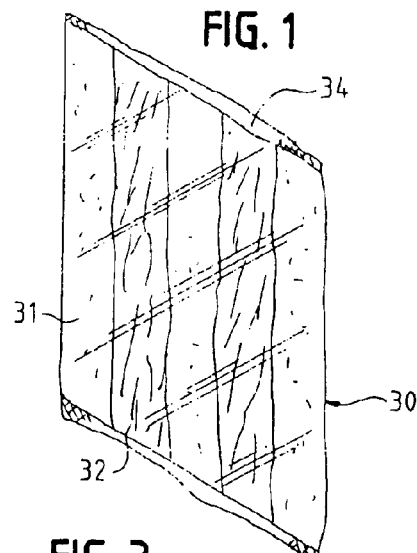
FIGS. 1–6 are perspective views of various forms of a food slice consisting of two different food items, according to the present invention.

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Preferred Jelly Formulations

The purpose of the jelly component of the present invention is to emulate the sensory characteristics found in the traditional counterpart fruit jelly, i.e. the sweetness level, tartness, and volatile fruit flavors. Additionally, texture, and the manner in which the gel yields to stress during consumption, allows for another characteristic release of flavor and tactile sensation similar to traditional jelly. Examples may be fracturing of the gel, not being overly chewy, and a melt-like breakdown when chewed. Conversely, the gel must also be able to release sufficiently from the packaging while being opened such that it remains intact as an integral slice and may be manipulated such that it can be eaten as a snack or manipulated or applied to another food item prior to consumption. These aspects then define a range of performance that the slices preferably conform to, and the formulations and process steps used become an important consideration.

Viscosity must be carefully controlled for jelly formulations according to the present invention. Techniques, methods and processes are now disclosed for doing so. Sugar may be either hydrated as a stock solution, or hydrated in the cooker with water and steam. Gums may also be hydrated by adding them directly to high fructose corn syrup followed by heating. With calcium-induced gelling agents, sugar may be used to disperse the gum. When direct steam is used, part of the high fructose corn syrup may be replaced partially by dry sugars. Grape juice may be added after cooking and dissolving of sugars. Calcium may be added if needed. However, calcium from the juice is often sufficient for gel formation. Acid may be added last, as is the normal practice.

Low methoxyl pectin and kappa carrageenan are particularly useful in forming the first gel in the two-step process. The purpose of this first gel is to create sufficient viscosity to flow through the extruder nozzle with integrity but without gel structure damage. A second slower gel-forming agent then is preferably used to firm the gel sufficiently for slice formation, stacking, handling, and packaging. Slow set high methoxyl pectin, gelatin, Konjac flour, starch or carageenan are useful in the second gel formation. After the first gel formation, agitation is reduced to avoid excessive gel breakage. As cooling increases gel strength and the likelihood of breakage of the gel structure, transfer pipes are jacketed to reduce heat loss. In addition, excessive shear at lower temperatures contributes to air incorporation, a cloudy appearance, and poor gel formation. Some gel structure breakage is normal, but with sufficient secondary gel formation and shear and temperature control, the final slice develops a uniform, unbroken structure.

While the preferred jelly and nut butter formulations described below involve a separate heating step, it will be understood that certain food items, such as dessert fruit gels, yogurt and fruit slices, etc. gel without the separate addition of heat, and "cold" extrusion may be provided for this purpose, within the scope of this invention.

JELLY EXAMPLE 1

High Aw Jelly

A grape jelly formulation found useful in the present invention has the following ingredients:

| Ingredient | Pounds | Weight Percentage |
| --- | --- | --- |
| Grape Juice Concentrate | 21.4 | 10.7 |
| Sucrose | 80.0 | 40.0 |
| Low methoxyl pectin | 3.0 | 1.5 |
| Slow set pectin | 4.0 | 2.0 |
| Citric acid solution | 2.0 | 1.0 |
| Water (as steam) | 16.0 | 8.0 |
| Water | 73.6 | 36.8 |

This formulation corresponds to a traditional type jelly except for the types of pectins used. Due to viscosity requirements during formation of the slices, the low methoxyl pectin adds thickness while the jelly is hot and flows well. As the packages are filled, formed into a slice, and then cooled, the slow set pectin then provides the proper finished texture in the slice. The two types of pectins are thought to operate at different temperature ranges, but each may contribute to the primary viscosity function of the other. The concentrations listed above were found to be optimal given the cooking, conveying, and extruding systems described here, but may be modified to conform to a particular forming system or to different product performance criteria.

It is believed that this jelly formulation of Example 1 could be changed, by raising the sucrose level to 45% by weight, such that the formulation could conform to the definition of "fruit jelly" as described in the U.S. Federal Code of Regulations, § 21:150.140.

JELLY EXAMPLE 2

Low Aw Jelly

Another grape jelly formulation found useful with the present invention, but which does not conform to the definition of "fruit jelly" as described in the U.S. Federal Code of Regulations, § 21:150.140, has the following ingredients:

| Ingredients | Pounds | Weight Percentage |
| --- | --- | --- |
| Grape juice concentrate | 25.0 | 12.5 |
| Fructose | 58.4 | 29.2 |
| Glucose | 24.2 | 12.1 |
| Konjac flour/carrageenan mixture | 2.0 | 1.0 |
| Slow set pectin | 4.0 | 2.0 |
| Citric acid solution | 1.0 | 0.5 |
| High fructose corn syrup | 63.4 | 31.7 |
| Vegetable oil | 2 | 1.0 |
| Water (as steam) | 20 | 10 |
| Water (as needed) | 0 | 0 |

This grape jelly spread formulation emulates traditional jelly for flavor and mouth feel while providing a lower water activity with excellent separation and manipulation qualities. Due to viscosity requirements in making the slices, the konjac/carageenan mix (Nutricol® DG474, FMC, Inc., Philadelphia, Pa.) provides excellent viscosity enhancing properties in a high sugar carbohydrate environment. The use of high fructose corn syrup and the use of the two granular sugars at a fixed ratio provide a system of maintaining sweetness while the amounts of dry and wet sugars may be easily adjusted to compensate for fruit juice moisture variations. As the packages are filled, formed into a slice, and then cooled, the slow set pectin then provides the proper set texture in the slice. The konjac/carageenan mixture and the slow set pectin are thought to operate at different temperature ranges, but each may also contribute to the primary viscosity function of the other. Vegetable oil provides enhanced lubricity and facilitates release from the packaging film. Again, the concentrations listed here were found to be optimal given the cooking, conveying and extruding systems described here, but may be modified to conform to differing forming systems or product performance criteria.

Preferred Nut Butter Formulations

The purpose of the nut butter component of the present invention is to emulate the sensory characteristics found in the traditional counterpart peanut butter, i.e., earthiness, oiliness, slightly sweet, slightly salty, roasted peanut-like flavor. Additionally, texture and the manner in which the nut butter yields to stress during consumption allows for another characteristic release of flavor and tactile sensation similar to traditional peanut butter. An example may be the stickiness while being consumed. Conversely, the nut butter must also be able to release sufficiently from the packaging while being opened such that it remains intact as an integral slice and can be manipulated such that it can be eaten as a snack or applied to bread or toasted bread before consumption. These aspects then define a range of performance that the slices preferably conform to, and the formulations and process steps used become an important consideration.

Several approaches can be taken to produce a nut butter mixture that will hold its shape in a slice. In the past, for example, this has been done by combining egg white protein and peanut flour, as described in U.S. Pat. No. 5,312,641 to Castillo. An acceptable slice, whether made to be extruded alone or in combination with jelly, consists of standard peanut butter, peanut flour, stabilizers, emulsifiers, and salt. A useful stabilizer is hydrogenated vegetable oil, while useful emulsifiers may include mono and diglycerides. The nut butter ingredients may be blended at ambient temperature and then heated to 165° F. with indirect steam. However, the water activity of this product is very low, at between 0.1 and 0.2. High fructose corn syrup is found useful in raising the water activity to the 0.4 to 0.5 range. The product has good flavor enhanced by the added sweetness. However, as the product was scaled up for continuous production, it was found to be particularly sensitive to shear. It is believed that irreversible protein interactions cause the oil to separate and the remaining solids to become too firm to pump or handle. This problem is found to be time and shear dependent. By adding corn syrup just prior to extrusion, it was found that the viscosity of the nut butter mixture could be controlled and oil separation could be avoided. Additional robustness during transport is provided by the addition of emulsifiers. This enables the formation of a combined nut butter and jelly spread food product in which the nut butter and jelly spread exhibit water activities within 0.1 unit of each other, thus providing enhanced storage stability. It is believed that this combined formulation will have a refrigerated storage life of at least about 3 months or more and, most preferably, about 6 months or more, even without the addition of food preservatives such as, but not limited to, sorbates.

NUT BUTTER EXAMPLE 1

Low Aw Nut Butter

A preferred nut butter formulation according to the present invention which also conform to the definition of "peanut butter" described in the U.S. Federal Code of Regulations, § 21:164.150, has the following ingredients:

| Ingredients | Pounds | Weight Percentage |
| --- | --- | --- |
| Peanut butter | 148 | 74 |
| Peanut flour | 46 | 23 |
| Stabilizers | 6 | 2 |

Peanut flour provides a firmer slice consistency. The stabilizer used is Grindsted PS 105 K (Danisco Ingredients, New Century, Kans., melting point of 165° F.), and is an example of a hard fat that may be used to prevent oiling-off. It has been found that the addition of such a stabilizer, in about twice the amount normally found in commercially available peanut butter, helps to firm the slice and to control oiling-off during slice formation and cooling.

NUT BUTTER EXAMPLE 2

High Aw Nut Butter

A nut butter formulation which forms another preferred embodiment of the present invention, but which does not conform to the definition of "peanut butter" as described in the U.S. Federal Code of Regulations, § 21:164.150, has the following ingredients:

| Ingredients | Pounds | Weight Percentage |
| --- | --- | --- |
| Peanut Butter | 100 | 50 |
| Peanut flour | 9.4 | 4.7 |
| Stabilizers | 6 | 3 |
| Maltodextrin | 10 | 5 |
| High fructose corn syrup | 69.6 | 34.8 |
| Dur-Em 114 Emulsifier | 2.8 | 1.4 |
| Salt | 2.2 | 1.1 |

The peanut flour and stabilizers have the same identity and uses as described in the nut butter formulation, Example 1, above. Maltodextrin and high fructose corn syrup are also added, and provide water to increase the water activity of the nut butter. The emulsifier Dur-Em 114 (Loders Croklaan Inc., Channahon, Ill.), a mixture of mono- and diglycerides, helps to prevent oiling-off during handling. The salt should be an extremely fine grind (e.g., average sieve size of 140 mesh) since very little water is available to dissolve a larger granule into solution.

Texture Profile Analysis

Attempts were made to quantify the texture profile analysis/hardness (see above definition of "hardness") of two preferred peanut butter and jelly formulations. A peanut butter/jelly laminate slice made according to the invention was peeled apart and the peanut butter formulation of Example 2, above, was analyzed using an Instron machine, Model No. 5542, fitted with a plastic cylindrical plunger probe. The actual surface area of the probe that impinged on the product was 5.02 cm$^2$. The slices of either jelly or peanut butter were stacked in a square column and the stack's firmness was determined using the Instron machine. This peanut butter formulation was found to have an average "hardness" of 1.02 Kg/cm$^2$ (range of 0.5–1.5 Kg/cm$^2$) when the temperature of the product was 43° F. and 48 hours after manufacturing. The jelly formulation of Example 2, above, was also analyzed in a similar manner and was found to have an average hardness of 1.84 Kg/cm$^2$ (range of 1.0–2.5 Kg/cm$^2$) when the temperature of the product was 43° F. and 48 hours after manufacturing.

Preferred Extrusion Techniques

The finished product form is determined by the type and design of extrusion manifold through which the food components are extruded. The previously prepared food components are delivered to the extrusion manifold by means of positive displacement (metering) pumps. A variety of extrusion manifolds may be employed to manufacture novel forms of the invention. These will be detailed in the following examples. Potential food configurations of the food items of the invention include food slices in laminate, striped (straight or wavy, marbled) or variegated shapes such as a polka-dot formation, as now described, though it will be understood that other shapes and configurations are, of course, possible.

Laminates

Figure 2:
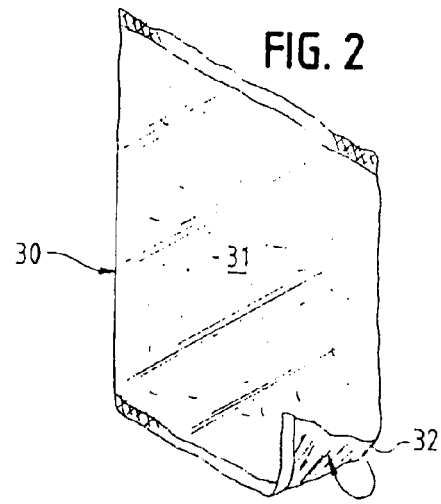

One preferred form of food slice 30 of the present invention is a bi-laminate, as shown in FIG. 2, such that each slice is composed of a single layer of nut butter 31 adjacent a single layer of jelly 32, with each layer being continuous and extending to the full planar dimensions of food slice 30. In this form, the food slice is preferably continuously co-extruded or co-laminated to create the finished product format in which the proportions of nut butter and jelly are approximately 50—50 by volume (quantity). Those knowledgeable in the art will realize that these proportions can be easily adjusted to deliver a wide range of possible component ratios depending on the desired finished product flavor attributes. Further, tri-laminates (two nut butter layers surrounding a jelly layer, for example) or other laminate shapes may be provided.

Figure 18:
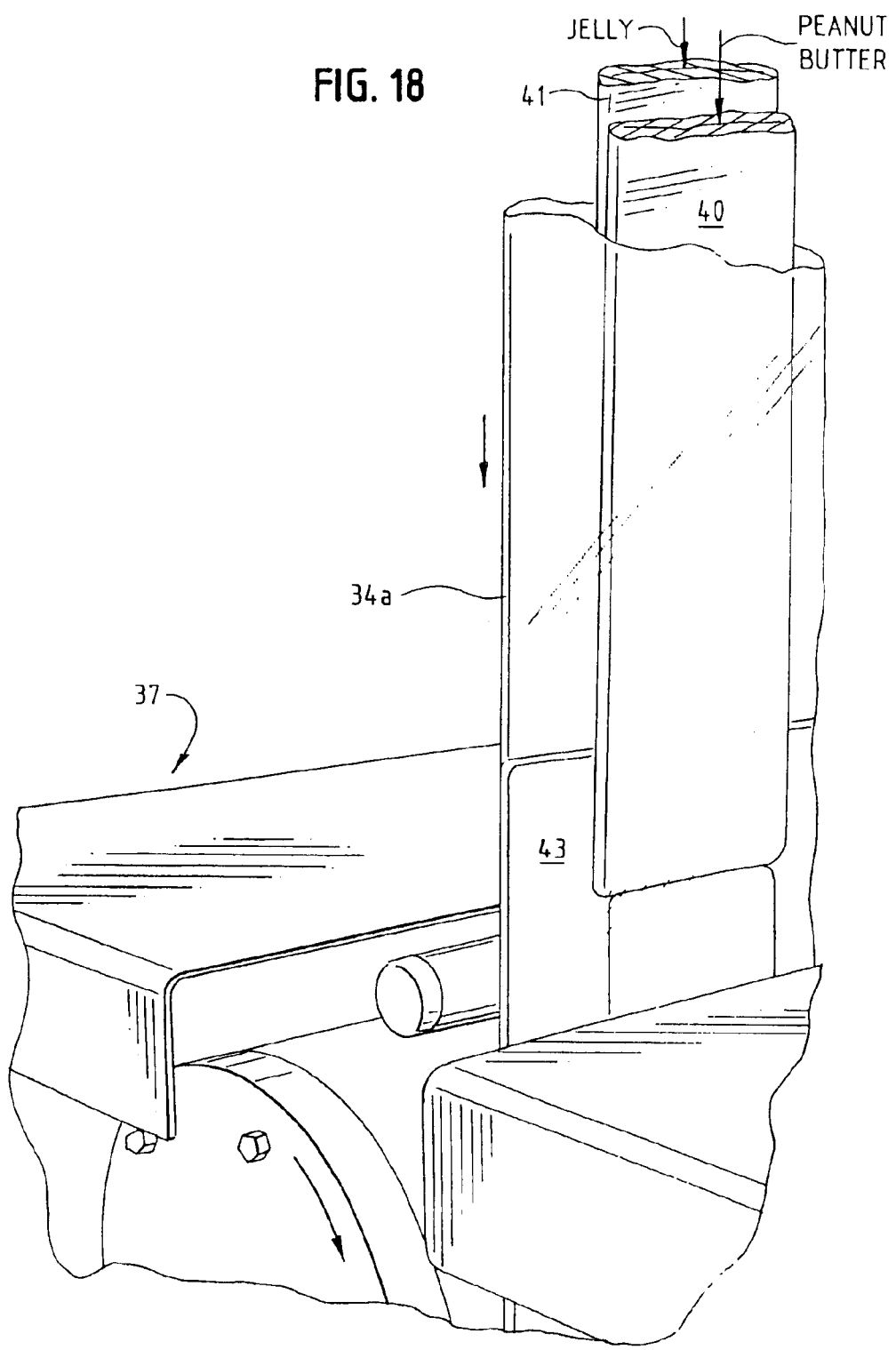
FIGS. 18 and 19 are enlarged side and front perspective view showing the fill tubes, divider plate and upper portion of the flattening belts.
Figure 19:
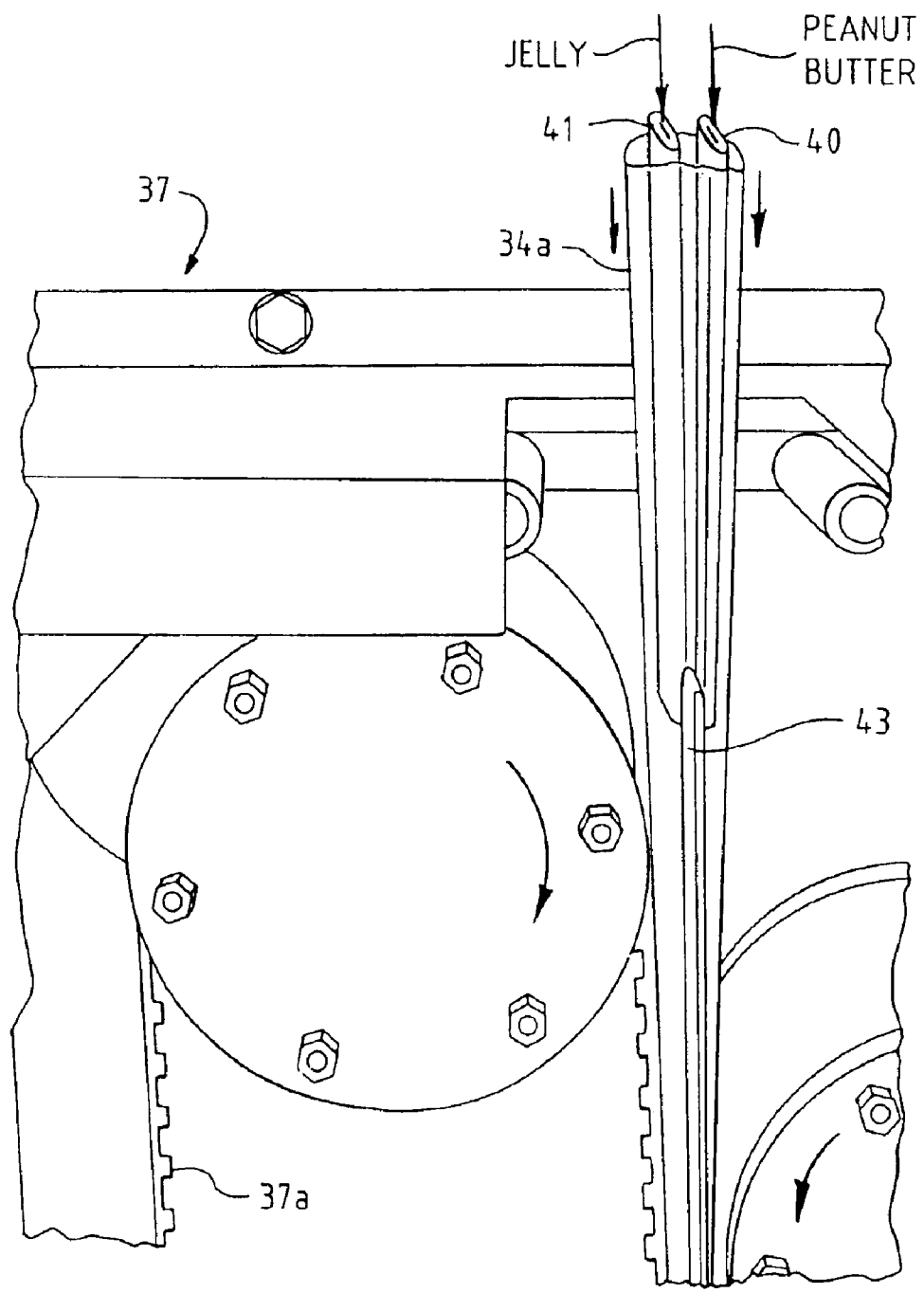

The preferred extrusion manifold design used to manufacture the bilaminate slice form, shown in FIGS. 13, 15, 18 and 19, consists of two flattened tubes, 40, 41, semi-elliptical in cross section (FIG. 15), which are placed with long axes parallel. As shown, in the preferred embodiment shown in the drawings, when a slice consisting of nut butter and jelly is to be provided, for example, both nut butter nozzle 40 and jelly nozzle 41 are of approximately the same length and terminate immediately above flattening belts 37 with gripping ribs 37a (see FIGS. 18 and 19). Alternatively, though less preferably, the flattening belts may have a smooth and flat outer surface. Since the ribbons are essentially suspended in air as the materials exit the nozzles there is opportunity for mixing due to normal slight turbulence. A divider plate 43 made of a non-sticking material or coating placed between the two ribbons for a short distance enables the laminated ribbons to reach the flattening belts without mixing together, so that the product maintains distinct sidedness. Preferably, a Teflon®-coated divider plate is used which extends down and slightly into the flattening belt region, as shown in FIGS. 18–19.

Figure 22:
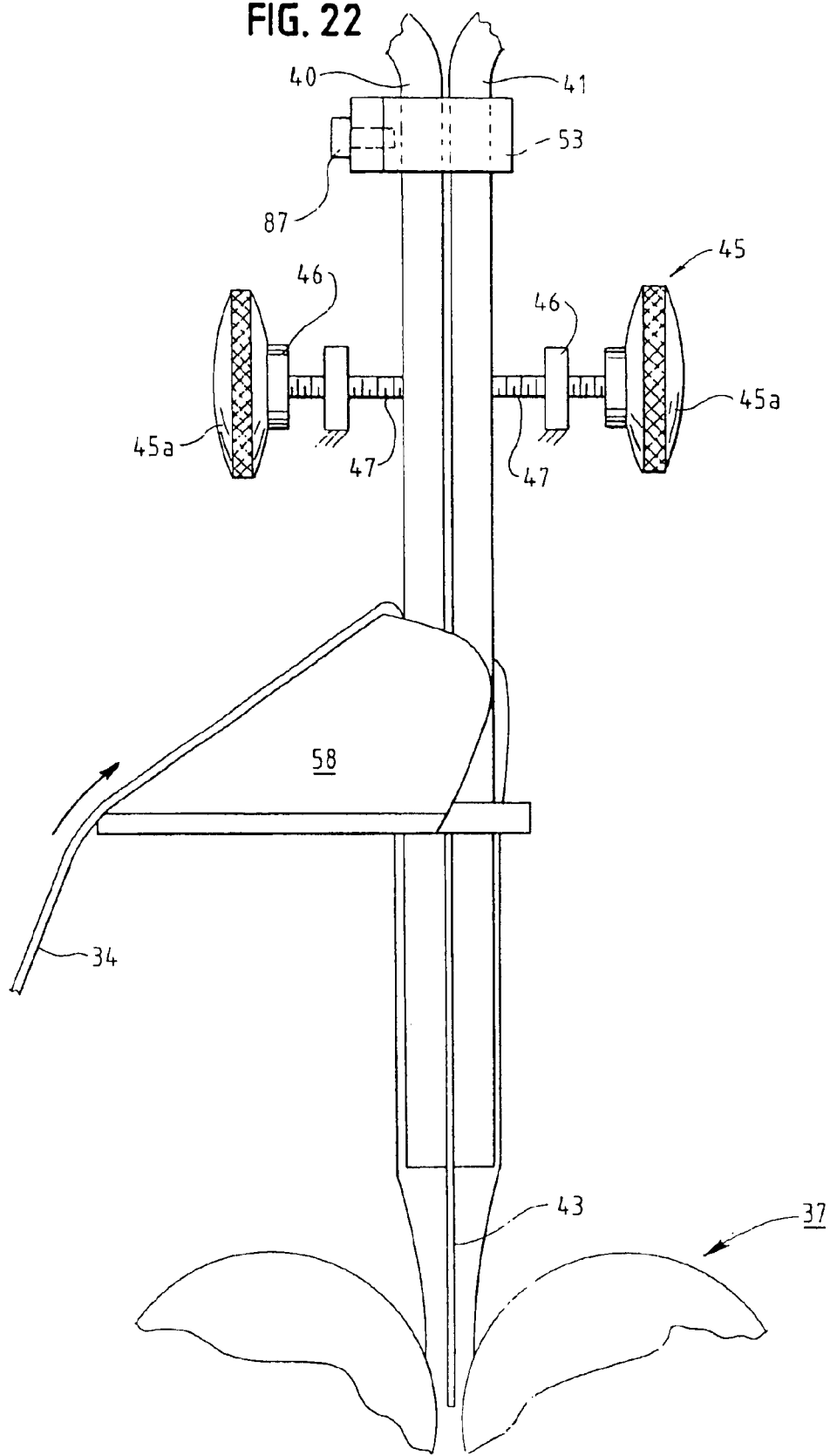
FIG. 22 is a schematic view of one preferred form of biasing mechanism for the fill tubes.

As shown in FIG. 22, a biasing mechanism may be used to slightly cant divider plate 43 to one side or the other, to control the relative thickness of the slices. Fill tube mounting bracket screw 87 mounts fill tubes 40, 41. A suitable device is biasing mechanism 45, which may include opposed knurled knobs 45a attached to threaded shafts 47. Shafts 47 are attached to mounts 46, and the ends of each shaft 47 is in contact with the side of a fill tube. Rotation of knobs 45a allows the operator to slightly bias divider plate 43 to left or right, which has been found useful to permit the operator to regulate the relative thickness of each (e.g.) bilaminate layer, so that the relative proportions of (e.g.) two products may be varied.

Striped Slices

Another form of the invention is a "striped" slice such that there are multiple distinct stripes/bands of nut butter and jelly, as shown in FIGS. 1, 6, 8, 17 and 21. These stripes may be formed in a distinct manner such that the border between the adjacent food components shows little (or no) mixing between the two food systems.

Figure 17:
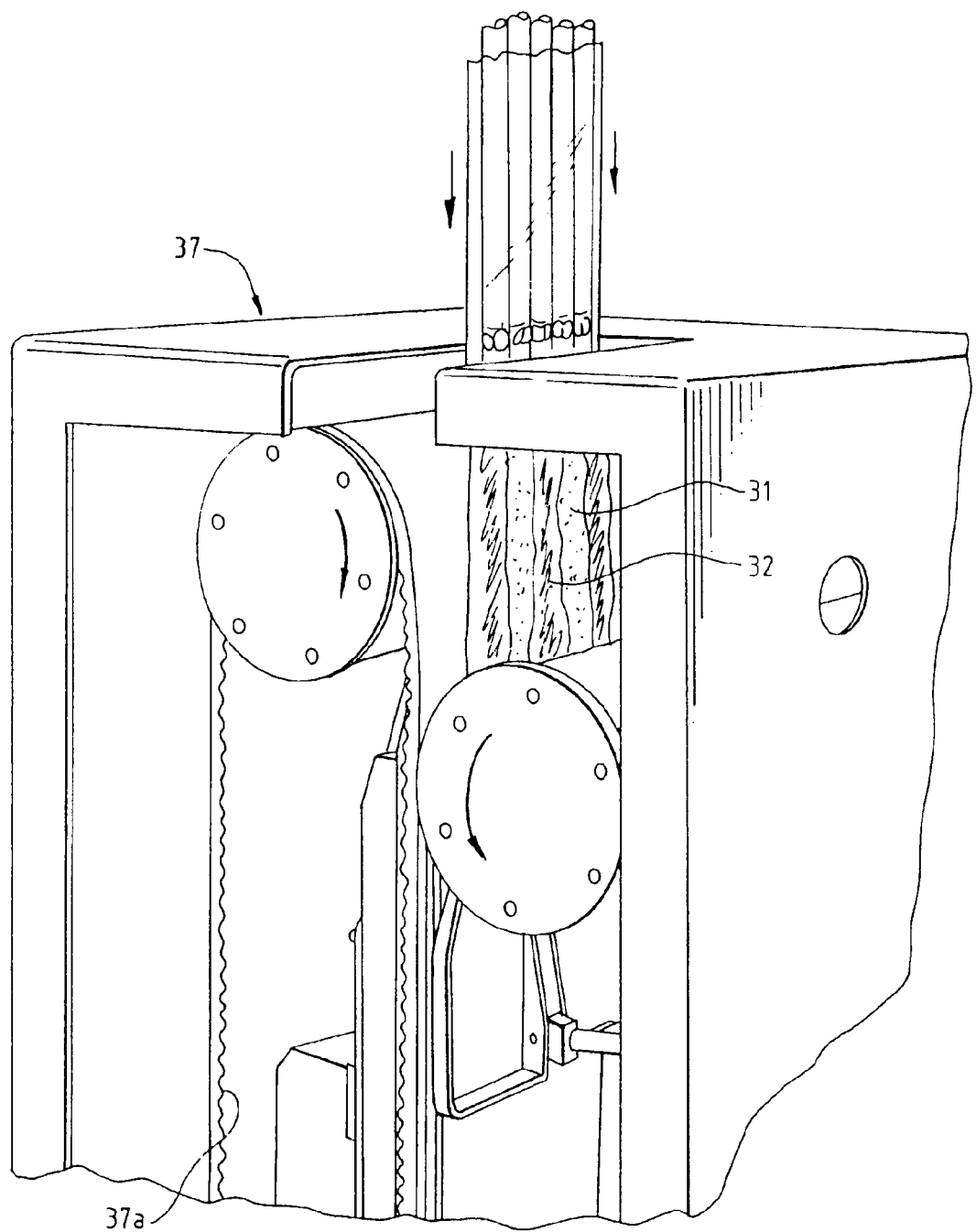
FIG. 17 is a partial, perspective view of fill tubes and flattening belts of the preferred slice forming machine.

The preferred extrusion manifold design used to create this format consists of multiple parallel tubes, alternating in the food component delivered, as shown in FIGS. 12, 14, 16 and 17. In a dual component food slice (e.g., nut butter and jelly), every other nozzle delivers one component while the remainder of the nozzles deliver the other food component, as shown in FIGS. 12 and 17. This creates a continuously striped pattern of extruded product. Rounded tube openings are satisfactory as long as the tubes are positioned close enough to the pinch-point of the flattening/slice-forming belts to minimize mixing and uneven boundary lines when the columns of material are flattened. Those knowledgeable in the art will realize that the invention need not be limited to a dual component system, but rather the possible number of different food components is only limited by the number of distinct nozzles used in the construction of the manifold. Referring to FIG. 12, extrusion nozzles 40, 41 are secured by support 53 and pass through film former 58.

Wavy, Marbled Slices

Figure 4:
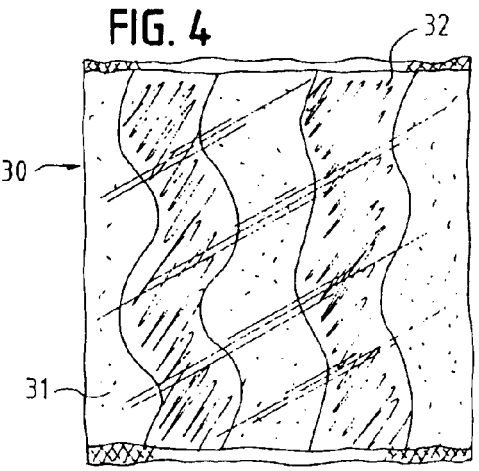

Alternatively, another format of the invention consists of a striped product in which the border between the adjacent components does not have to be "straight" or strictly linear but may be an undulating, irregular, swirled, or "wavy" border, as shown for example in FIG. 4.

The extrusion manifold used to create this form is the same as that described above for the "striped slices". In this application, the rate of delivery and/or the rate of packaging film feed can be manipulated to provide for a less than smooth supply of food component. The resulting product has stripes which show some slight mixing and irregularity in the border between components.

Figure 5:
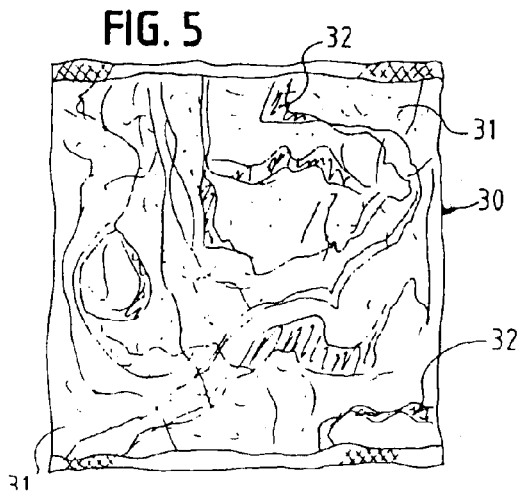
Figure 6:
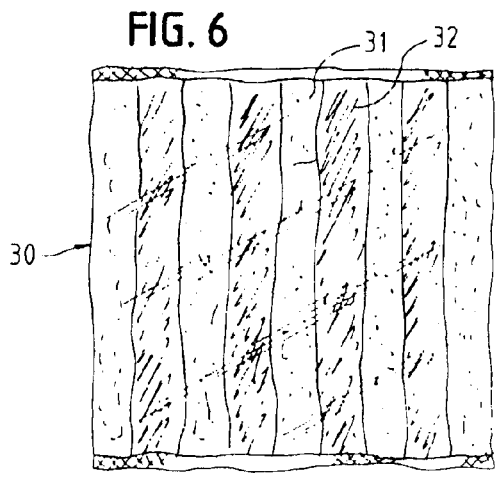

Alternatively, this form can be created by employing the manifold described above for laminate slices, with minor modifications. If the divider plate is removed from the twin tube manifold, the two food components will mix after extrusion and, if contrasting in color, will create a "marbled" appearance in the finished product, as shown in FIG. 5.

Variegated Slice Forms (e.g., "polka-dots")

Figure 3:
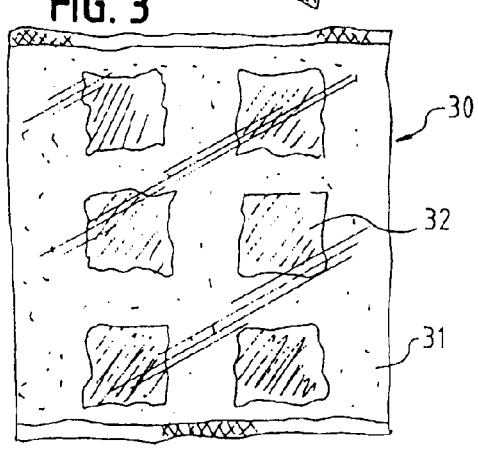

Yet another format of the invention can be described as a continuous phase in which one of the food components is interspersed within the other in a variegated format, as in a "polka dot" or other similarly randomized pattern or dispersion of pockets of the non-continuous phase within the multi-component food system (e.g., FIG. 3). The interface between the two or more different food systems maintains the aforementioned distinctness of border/margin.

The preferred extrusion manifold design for providing this food configuration consists of a single flattened tube, elliptical in cross-section, into which one or more smaller diameter tubes are inserted. The continuous phase of the food slice may be delivered via the larger tube while the interspersed component(s) may be conveyed via the inner tube(s). Those knowledgeable in the art will realize that if the delivery rate of the food component delivered by the smaller internal tubes is pulsed or metered such that it is supplied at a non-continuous rate while the food component in the outer tube (continuous phase) is supplied at a continuous rate, the resultant food slice will contain polka dots (blobs, patches, etc.) of the non-continuous component surrounded (embedded) in the continuous component. The number and diameter of the inner tubes as well as the product flow rate through these tubes will determine the number, size, and distribution of the polka dotted food component within the food slice.

Slice Formation and Packaging

The components of the food slice are delivered directly into packaging film sleeve 34*a* during the extrusion process, as best shown in FIGS. 17 and 18. It is at this point that one of the slice's dimensions (length) is determined. The length of the finished product may range, for example, from 2.5" to 5.0". Alternatively, production machinery is available that determines both the length and the width of the slice at this point. Finished product dimensions may range from 2.5"× 2.5" to 4.5"×5.0", for example.

Referring to FIG. 7, immediately downstream from the extrusion manifold, the continuous band of filled packaging material passes through flattening belt portion 37 of packaging machine 25. It is at this point that the thickness of food slice 30 may be controlled. The thickness may be in the range from 0.125" to 0.375", for example.

Figure 27:
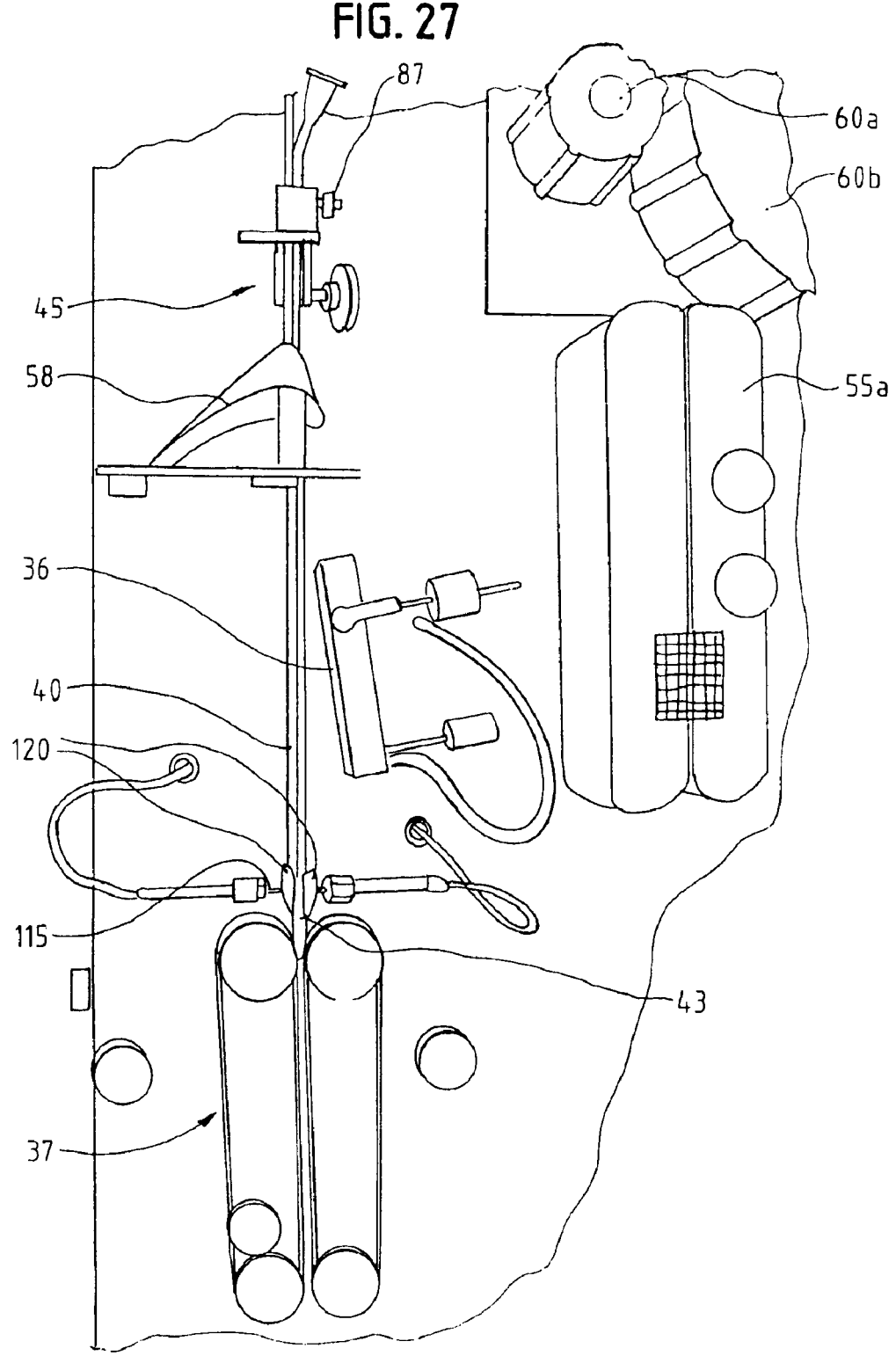
FIGS. 27 and 28 are perspective and enlarged perspective views, respectively, showing, among other items, a preferred bubble level control device for use with the preferred individual wrap slice machine of the present invention.
Figure 28:
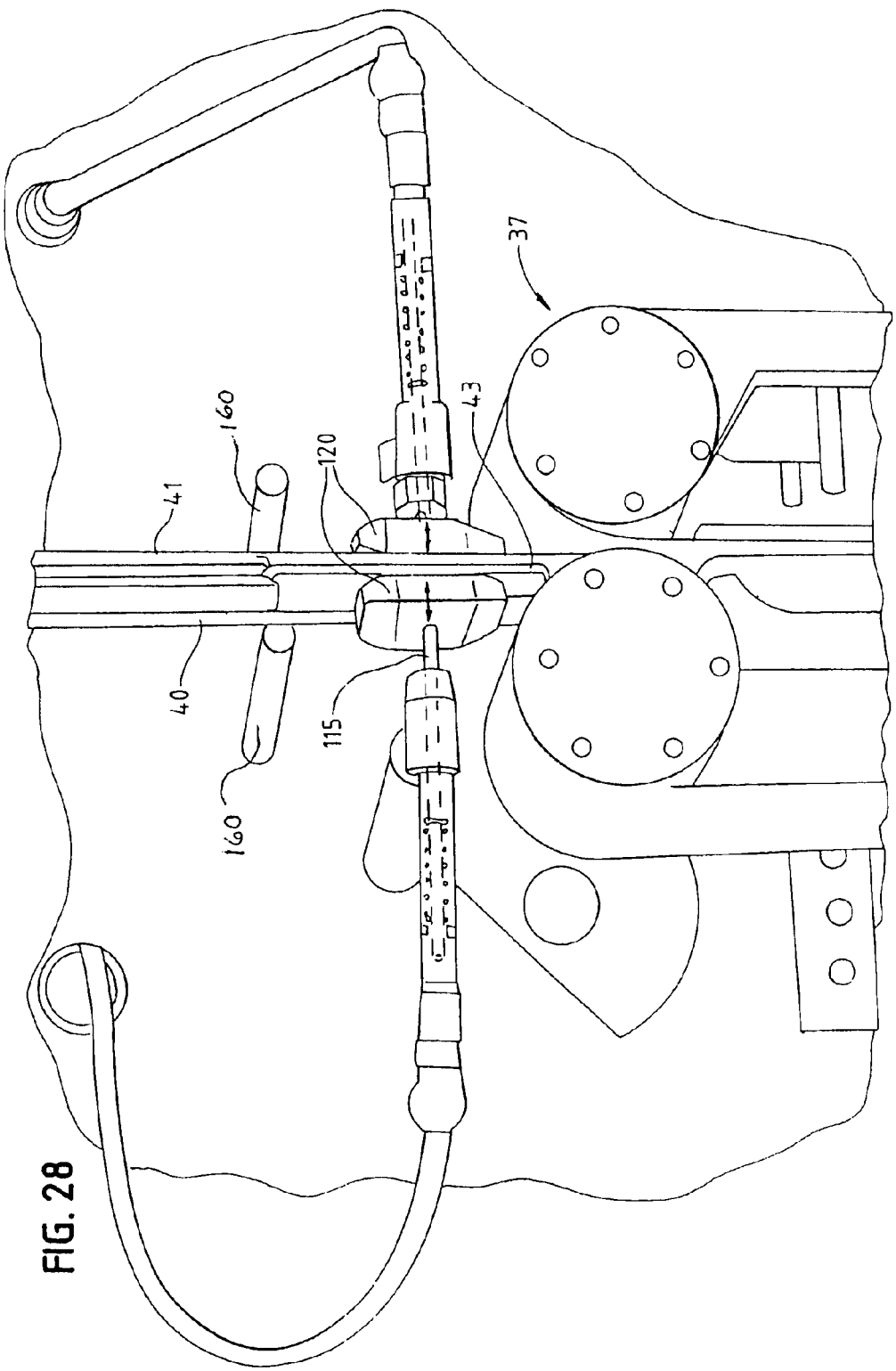
Figure 29:
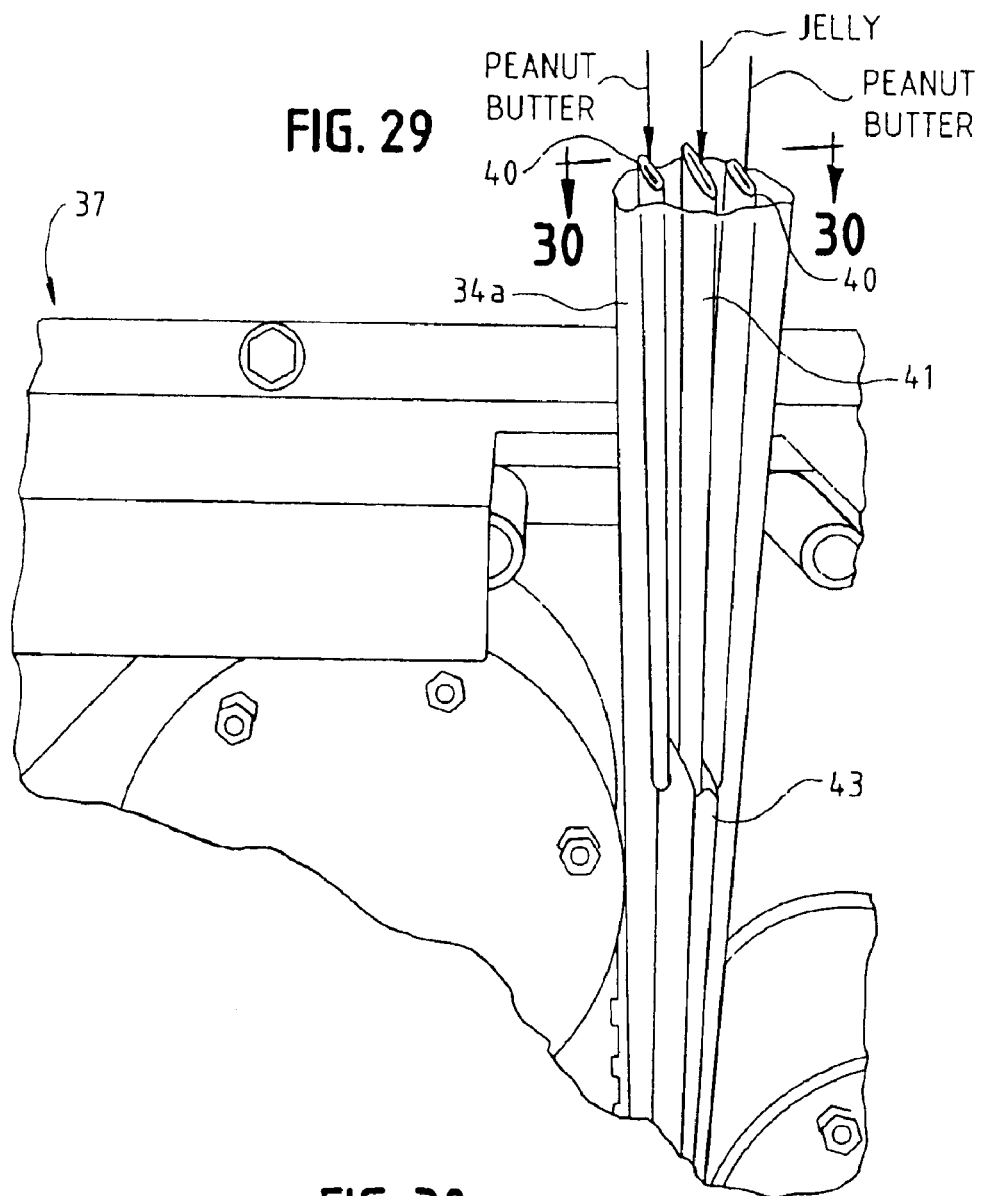
FIG. 29 is a partial perspective view showing one embodiment of an extrusion nozzle and divider plate configuration for making tri-laminate slices.
Figure 30:
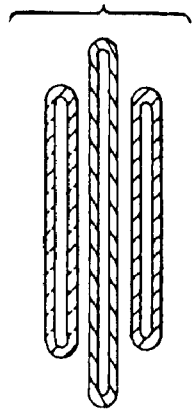
FIG. 30 is a cross-sectional view taken along lines 30—30 of FIG. 29.

A In the preferred embodiment, and referring now to FIGS. 27–28, a bubble control device is used to control the amount of product that enters within the wrapping/packaging film. This devices maintains a consistent weight of food product for each slice produced by the machine. Food portions are forced between the two layers of film by a pump which is driven by an electric motor and controlled by a variable frequency drive (VFD). The control circuit for this device includes: a VFD; an AC Motor; a linear variable differential transformer (LVDT), a sensing device which preferably includes a linear moving shaft 115 and a plastic contact plate 120 that makes contact with the film; and a programmable logic controller (PLC)). The VFD controls the speed at which the AC motor rotates which, in turn, controls how much product is pumped between the layers of film. The LVDT has a scaled voltage range; as the linear shaft moves, the voltage produced by the sensor changes. The food product pumped between the film layers causes the film to expand or contract depending upon the amount of product being forced in. This change recognized by plastic contact plate 120 that is mounted to the LVDT. The expanding and contracting film causes the LVDT shaft to move, resulting in a different voltage being read. The PLC is set up with a table to correspond voltage and weight. A set point for weight is entered into the PLC through an operator interface or "human machine interface" (HMI) or similar device. The PLC correlates the voltage from the LVDT to the set point and, based upon the relation, supplies a signal to the VFD which causes the motor to increase or decrease its speed. This process of "control" occurs on the fly and is a continuous state of monitoring and adjustment. The control circuit described above applies to both weight control of food items such as jelly and peanut butter, for example, and may also be used for other food products with similar viscosities. Various devices and manufacturers exist which are useful for this application, including: PLC (Allen Bradley SLC family or PLC 5 family processor and analog I/O, or equivalent); VFD (Magnetek 515 GPD or equivalent); LVDT (Lucas Schaevitz SN 8477, part No GCA-121-250); AC Motor (Baldor 2HP or equivalent size and brand; employs a gear reducer).

Figure 20:
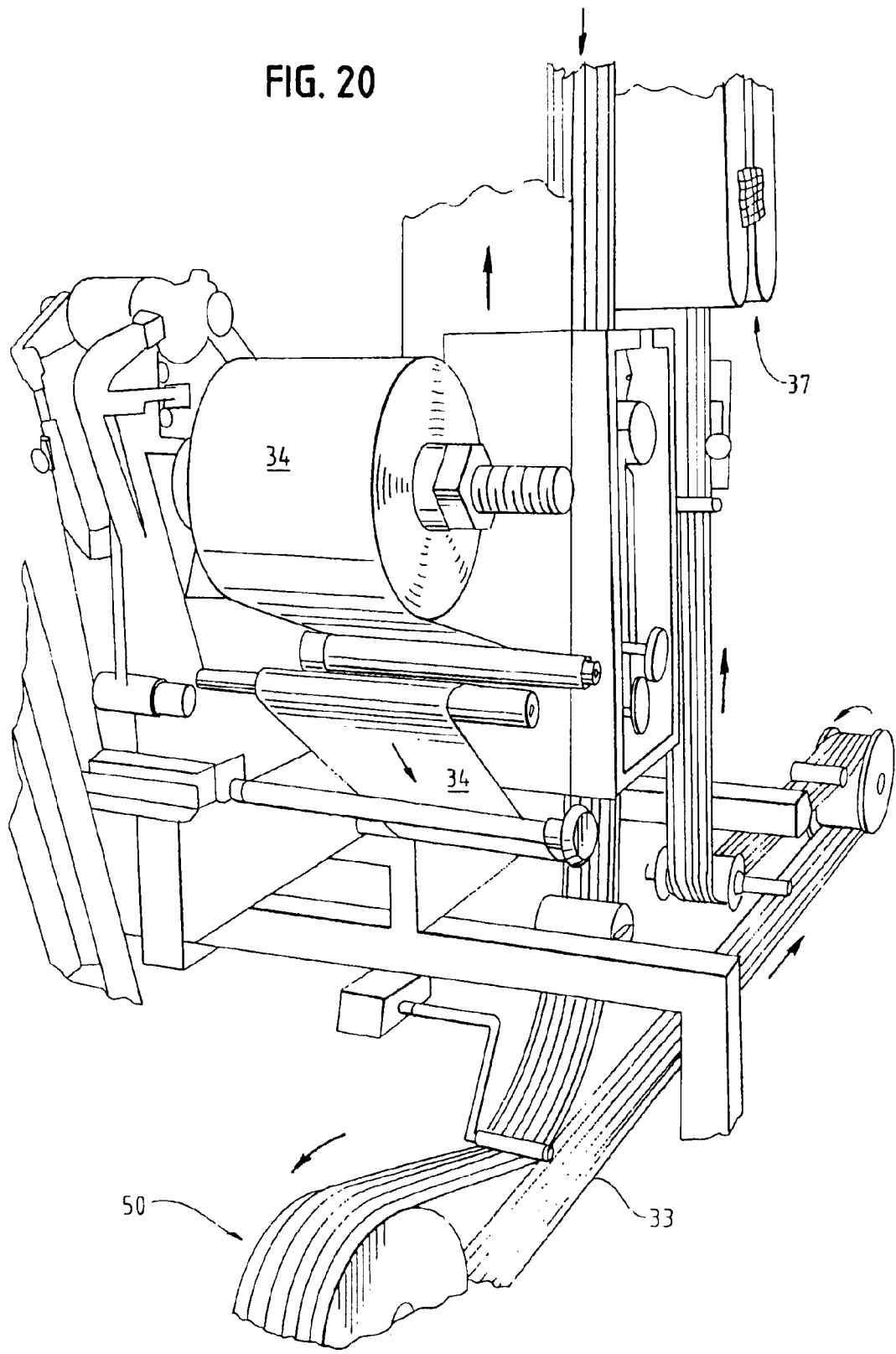
FIG. 20 is a partial side perspective view showing the wrapped ribbon of striped food product during passage through a preferred individually wrapped slice forming machine of the present invention.
Figure 21:
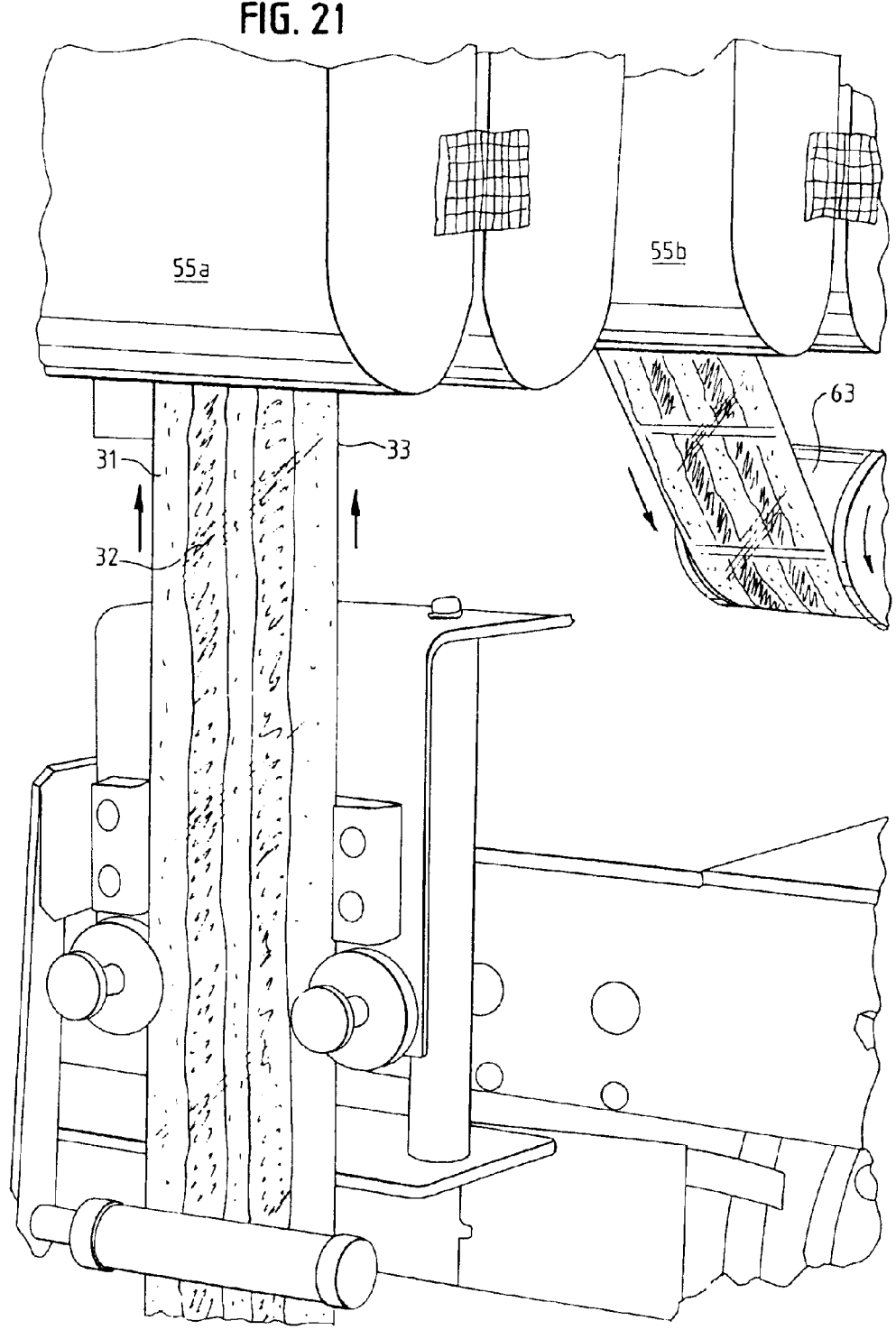
FIG. 21 is a partial side perspective view of the filled web leaving the drum (cross) sealer of the preferred individually wrapped slice apparatus.

After the food slice has been sized to its desired thickness, it may pass into chilled water bath 50, as shown in FIGS. 7 and 20, where it may be cooled. Chilled water may also be provided by perforated water jets 160 prior to the flattening step, as shown in FIG. 28. The temperature of this cooling bath determines the product handling characteristics later in the process. Those knowledgeable in the art will realize that the preferred bath temperature and corresponding finished product temperature is dependent upon the bath temperature and the amount of time the product is exposed to this temperature (residence time is proportional to line speed/ throughput). The target temperature of a combined nut butter/jelly product, for example, as it exits the cooling bath is found to be optimal when it is in the range of about 50°–70° F. Other combined food products may require different cooling periods or, alternatively, ambient temperature cooling may be sufficient. A suitable roller system is provided for facilitating use of film 34 and the passage of ribbon 33 through the preferred individual wrap slice machine, as partially shown in FIG. 20, and as well known.

Referring to FIG. 7, after the wrapped ribbon 33 of product is cooled, the continuous web of packaging material encased product may pass through gripping belts 55a, and then through cleated drums 60a, 60b and 60c, where the cross-seals may be pre-crimped and heat sealed, as disclosed in the Meli '792 patent. A second pair of gripping belts 55b and suitable rollers, such as roller 63, may be used to maintain tension on, pull and guide the web downstream of the cross-sealing drums. Alternatively, cross-sealing may be accomplished with a single cross-sealing mechanism, and prior to cooling, as disclosed in the Meli '860 patent.

The cross-seals may then be cut laterally to separate each individual food portion from the previously continuous web of product. The individual food portions, such as food slices, may then be conveyed to a stacking machine which counts, stacks, and prepares the product for its overwrapping, as for example is disclosed in U.S. Pat. No. 5,114,307. A suitable overwrap may be provided to a predetermined number of the already packaged food slices, such as by using a Hayssen overwrapper.

Figure 25:
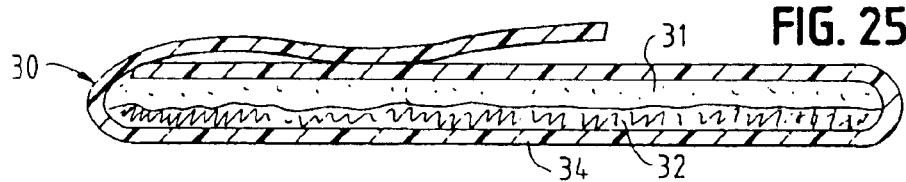
FIGS. 25–26 are schematic views of lap and fin seals, respectively, which may be used for sealing packaged food slices, as is well known in the art.
Figure 26:
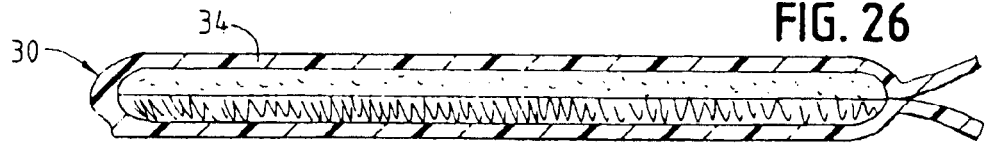

The individual food slices, thus packaged and sealed in a flexible plastic wrap, may have a longitudinal seal and cross-seals which are hermetic, as disclosed in the Meli '860 patent, but which need not be. Either overlapping ("lap") or fin/side seals may be provided for this purpose, as shown in FIGS. 25 and 26. The provision of one seal type or the other is well known to those skilled in the art, depending upon the equipment used. For example, longitudinal sealer 36 shown in FIG. 27 has a single bar riding against a facing stationary plate and produces a lap seal, while the longitudinal sealer with undulating opposed plates, disclosed in the Meli '860 patent, produces a fin seal. Each seal type has advantages. For example, lap seals tend to provide the consumer with a seal having a more conventional appearance. Fin seals allow the package to be delaminated and the sometimes sticky product removed without the necessity of the consumer actually touching the food item during opening.

The use of high oxygen barrier packaging films is preferred. A suitable innerwrap film structure is a 1.5 mil thick multi-layer cast film that has a base layer made out of polypropylene, a layer of ethylene vinyl alcohol that provides a good oxygen barrier to prevent oxidation of the food product, and outside sealant layers made out of a blend of polypropylene, low density polyethylene, polybutylene and a glycerol mono stearate release agent. An example of this is a Printpack Inc. packaging film known as Specification No. 98506. It was found that the presence of peanut oil in the nut butter interferes with the formation of cross-seals. To overcome this problem, a more aggressive film sealant, such as found in this Printpack film, is preferably used.

Regulating Water Activity For Jelly/Peanut Butter Slice Formulation

In order to maximize shelf life, water activity of one or more of the food items is modified. Water activity is a prediction of how moisture differences between two or more dissimilar products will equilibrate over time. If excessive moisture migration takes place, discoloration and flavor degradation can occur. A measure of potential water migration can be determined from water activity, Aw, as defined earlier. The range of water activity is from 0.00 to 1.00. An example of a low water activity food is whole milk powder, Aw=0.20, while an example of a high water activity food is Cheddar cheese, Aw=0.90. Traditional peanut butter has an Aw of about 0.20, while jelly has an Aw of about 0.85. According to the present invention, the food items to be packaged are preferably modified to bring their water activities to within acceptable ranges such as, for peanut butter and jelly, about 0.5 units of each other or less or, most preferably, within about 0.1 to 0.2 units of each other, which is believed to be an acceptable amount for achieving combinations of such food items with a stable shelf life and without excessive discoloration or flavor degradation.

Additional process considerations apply to jelly used with a combination nut butter/jelly slice product than those which apply when jelly is processed alone. Thus, there is also a need to control the water activity within such a slice, to lengthen shelf life, limit product discoloration, etc. Preferably, the water activity in the jelly is lowered to about 0.6, which is about 0.1 to 0.2 more than the water activity of the nut butter. However, it has been found that the preferred jelly formulations described here, when used with the preferred nut butter formulations described here, provide adequate control over water migration—related discoloration defects even when the differences between the water activities are about 0.4 to 0.5.

Preferred Processing Techniques For Nut Butter/Jelly Formulations

Processing techniques for preferred nut butter and jelly spread formulations to be combined into a combined food slice are now described in detail.

Figure 24:
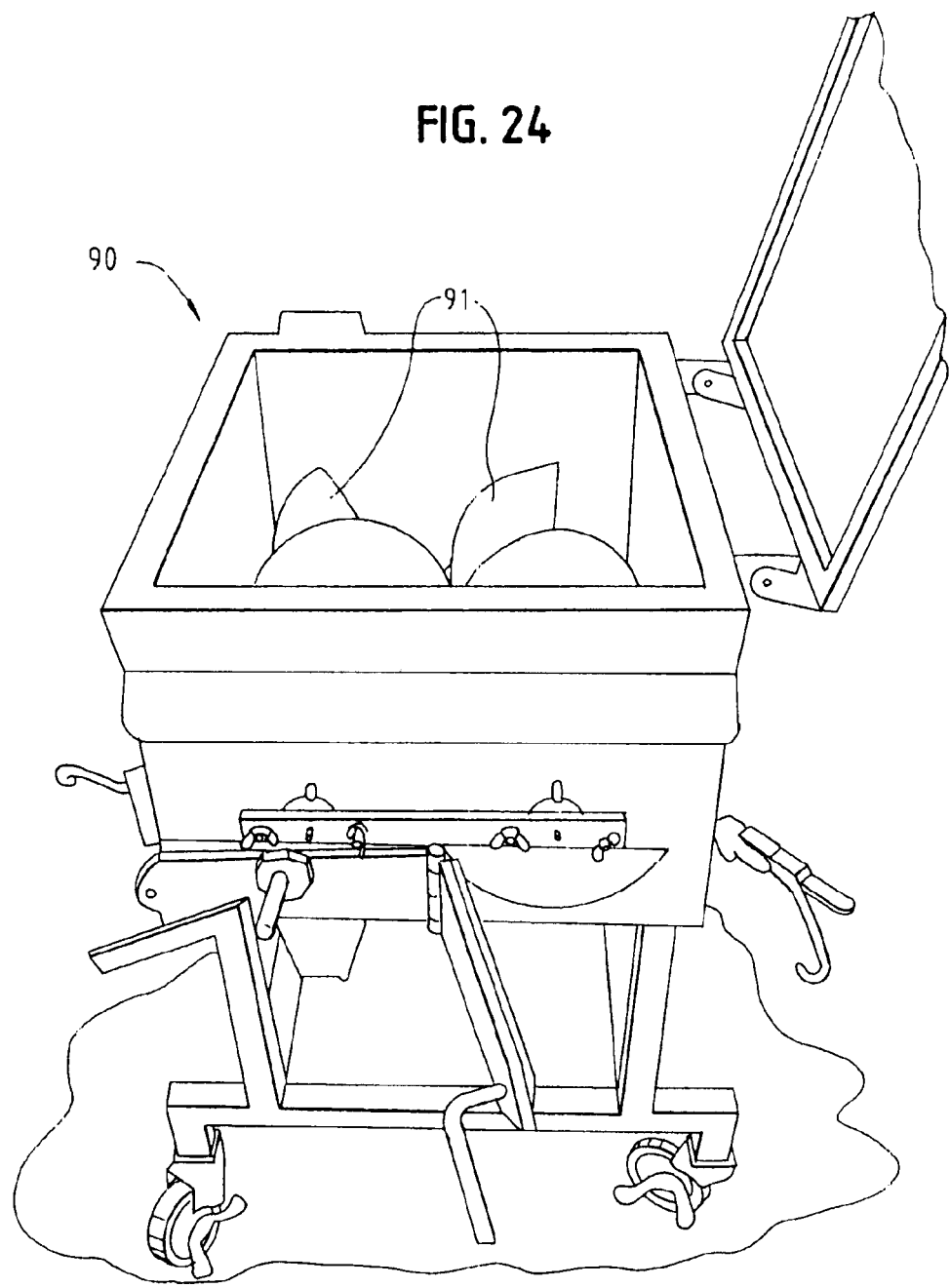
FIG. 24 is a perspective view of a preferred blender/cooker useful for blending high fructose corn syrup into the nut butter, prior to extrusion, in a preferred nut butter formulation of the present invention.

The nut butter formulation of Example 2, above, is prepared as follows. Referring to FIG. 24, peanut butter, maltodextrin, peanut flour, salt, stabilizer, and the emulsifier are combined in a suitable open mixing vessel 90, such as a twin screw Reitz cooker with counter-rotating mixing augers 91, as shown. Augers 91 may be turning at approximately 60 RPM. These ingredients are folded together and allowed to mix until the mass achieves a homogenous appearance. The mixture is then heated to 170° F. using the steam injection jacket of the cooker and with the same mixing conditions. The mixture temperature should be monitored as it approaches the desired temperature since the indirect heat will continue to heat the product even after the steam is turned off. In practice, the steam heat is discontinued once the temperature reached 162° F.

Once the peanut butter slurry is heated to the target temperature, the auger rotation rate is slowed to approximately 10–20 RPM. At this time, the high fructose corn syrup (HFCS) is added to the mixture and combined with the same slow agitation. It is important that the amount of mixing the nut butter and HFCS combination receives is only enough such that the two are commingled until just homogeneous. If additional shear (mixing) is supplied, there is a risk that the emulsion formed by the nut butter and HFCS will be broken and the result will be a sticky mass which will freely exude peanut oil. (Conversely, too little mixing results in non-uniformity of a product that will not separate cleanly from the packaging material and will be variable in terms of flavor (sweetness) and texture.) Once the nut butter and HFCS have been combined, the mixture is removed from the cooker and transferred to a hot water jacketed static hopper atop the pump used to supply the nut butter to the extruder. The jacket temperature of the hopper is preferably maintained at between about 110°–140° F. The jacketed hopper serves as the reservoir for the finished nut butter immediately prior to the extrusion process.

It was discovered that the addition of HFCS to peanut butter must be delayed until just prior to extrusion. Conversely, adding corn syrup early in the mixing process results in an unpumpable grainy mass with separated oil. It is believed that the water added to the mixture via the HFCS is partitioned with HFCS during initial mixing stages. Through heat, diffusion and some degree of shear during conveyance, a portion of water eventually finds its way to and adheres to the proteins. The rate of adherence of the water to proteins, and the resulting textural change, takes time based on these variables. Proteins are used as part of the emulsion system when found in the low moisture environment of peanut butter. The proteins aid in holding the peanut oil in suspension. When presented with either water or oil, the peanut proteins prefer water. The eventual movement of the water to the proteins then provides some of the textural attributes found in the finished nut butter slice, but this occurs after the slice has been formed due to a delayed movement of water bonded on the HFCS molecules to the protein molecules. It is interesting to note that the addition of pure water to the nut butter has the almost immediate effect of providing a very heavy, grainy body that also exhibits oiling-off when mixed or pumped. The finished nut butter product, made with a late HFCS addition and having a water content at a high level, does not noticeably become heavy and grainy. This is believed due to the partition delay in using the HFCS when being pumped and extruded under high shear and the micro shear environment of slice cooling and subsequent slice handing. There is also some degree of continued textural changes in the finished slice for up to about 12 hours. In short, the nut butter should be given time to set and form its shape before water in the HFCS is added to it.

It will become readily apparent to those skilled in the art that heated nut butter, containing only ingredients found in commercially available product that are filled into jars, will become firm as the temperature cools and the emulsion has time to set up due to crystallization of fat and other interaction not entirely know about the food system. It is believed that the interaction of water with peanut protein in the nut butter formula with the added HFCS enhances texture and cohesiveness so that the nut butter formulation approximates commercially available counterparts; this, despite the fact that the addition of added sugars, bulking agents, etc. would predict a textural interruption and a resulting softened body.

Alternatively, as opposed to the batch processing steps just described, the nut butter may be made in a continuous fashion by using a scraped surface heat exchanger (SSHE) and an alternate means by which the HFCS is added. In this case, and referring now to FIG. 23, the initial ingredients added to the Reitz cooker can be combined in the form of a premix. This premix may be prepared by mixing these ingredients in a mixing vessel, such as hopper 62, without heat but with sufficient mixing to insure that all ingredients are well combined. In practice, the preferred apparatus for this purpose is a twin screw Reitz cooker, although those knowledgeable in the art will realize that there are many other means by which the peanut butter premix ingredients could be combined, such as by using in-line mixing elements, low shear planetary mixers, vessels/equipment containing augers, or other mixing elements.

The peanut butter premix thus prepared is then cooked via a SSHE using indirect heating. In practice, a Contherm® SSHE with 4 of the 12 internal mixing blades in place and a shaft rotational rate of approximately 120 RPM was used to heat the mixture to 175±50° F. The heated product is then pumped to mixing vessel/use hopper 65, which also has the recently cooked nut butter with the desired amount of HFCS. In practice during pilot-scale experiments, the preferred mixing vessel used was a 45-pound capacity twin screw Reitz blender/cooker 90, as shown in FIG. 24 (length, 18"; width: 15.25"; depth: 12"; auger diameter: 7.75") with a variable speed controller to regulate the RPM of auger 91 although, again, those knowledgeable in the art will realize that many different mechanical means could be used for this purpose. The HFCS may be added to a corner of the cooker shown in FIG. 24, for example, while the heated nut butter may be added in the middle of the cooker, between the two augers and about 6-inches back from the front face, for example.

The heated nut butter and HFCS are allowed to mix such that the two streams are adequately combined, although not so much that the combination begins to appear "grainy", as this is an indication that the stability of the product (emulsion) is being compromised. The exact mixing/auger rotation rate and residence time in the mixer is dependent upon the flow rates of the two streams and the level within the mixing vessel. The extent of agitation is controlled visually to prevent deleterious over-mixing. As in the previous procedure, once the nut butter and HFCS are adequately combined, the mixture is transferred to a (jacketed) static hopper located atop the pump used to supply the nut butter to the extruder.

Figure 23:
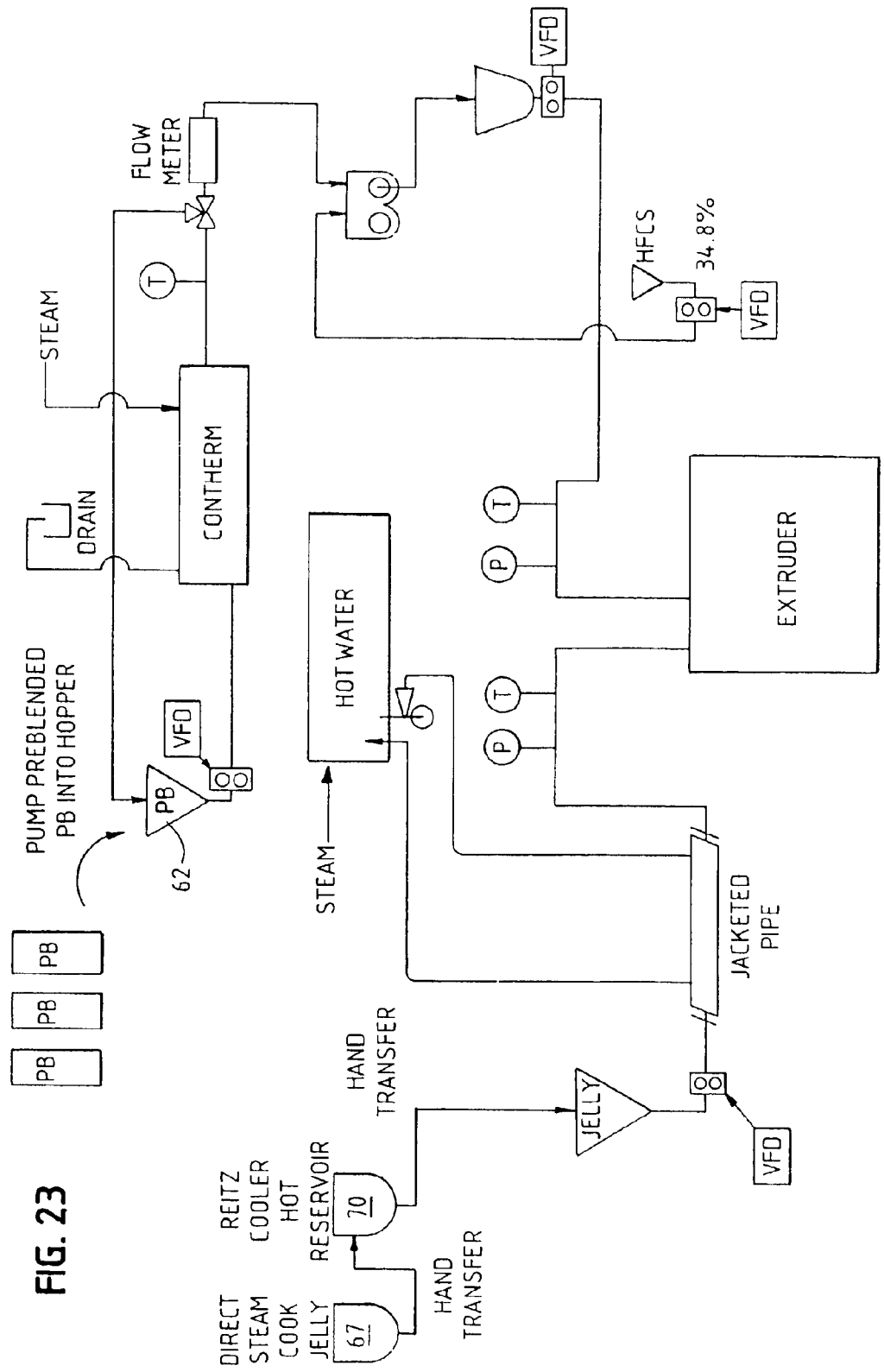
FIG. 23 is a schematic view of a preferred process for preparing and processing laminate food portions consisting of (e.g.) peanut butter and jelly according to the present invention.

Still referring to FIG. 23, preferred processing steps for preparing a jelly formulation according to Example 2, above, begin with the addition of the HFCS to twin screw Reitz cooker 67. With the augers turning at approximately 150 RPM, the crystalline fructose, glucose (dextrose), konjac flour/carageenan blend (e.g., Nutracol®) DG474) and pectin are added. These ingredients are allowed to mix until thoroughly combined, which takes about 1–5 minutes (preferably about 3 minutes). The mixture is then cooked, preferably for about 6 minutes, with the augers still turning at about 150 RPM. Cooking is achieved by injecting low-pressure live steam into the mixer using the standard steam injection vents of the Rietz cooker such that the sugars and hydrocolloid slurry are brought to 200° F. Once this temperature is reached, the consistency of the slurry is examined to insure that there are no lumps or undissolved/undispersed particles. If there are such particles, the slurry is allowed to mix until they are reduced. The cooker is then opened, and the augers are slowed to low speed and scraped (about 1 minute). At this point, the liquid vegetable oil, fruit juice concentrate and citric acid are added to the mixture. These last components are allowed to mix (about 1 minute) until homogeneously distributed.

The finished jelly is then transferred to another twin screw Reitz cooker 70 where it is held with slow agitation (10–20 RPM) and with indirect heat supplied by the cooker's jacketing such that the product remained at approximately 150° F. Alternatively, any jacketed scraped surface or agitated mixing vessel may be employed for this purpose. When the jelly is ready for use, it is transferred from the cooker to the (jacketed) hopper atop the pump used to supply the jelly to the extruder. To overcome the tendency of the product to gel when cooled without agitation, only small amounts are transferred to the hopper at a time. In practice, for pilot-scale experiments, the hopper had an approximate capacity of 25 gallons. It has been found practical to limit the amount of jelly in the hopper at any time to 15–20 gallons. This allows the temperature of the jelly to remain in the 130–150° F. temperature range and permits a more rapid turnover of product in the hopper. The jelly in the hopper is kept agitated by means of a manually operated paddle which is used to stir the product during use and as additional material is added to the hopper.

Alternatively, the jelly may be prepared without the use of direct steam injection. Although a slower process, indirect heat supplied by a steam jacket on the cooker has been found adequate for cooking the jelly component. Using this technique, all of the water supplied by the steam condensate (previously described method) must be added directly to the batch in order for the desired moisture and solids content to be achieved.

With calcium-induced gelling agents, sugar may be used to disperse the gum. To aid with dispersion, solubalization, and activation of the gelling agents, the mixture should be heated, during a mild to moderate degree of shear produced from agitators, to about 200° F. and held there for about 0.5 to 2.0 minutes. When direct steam is used, part of the high fructose corn syrup may be replaced partially by dry sugars. Following this heating step, the mixture can then be cooled to a temperature which will provide desired extrusion viscosity. Grape juice may be added after the cooking and dissolving of sugars and gelling agents. Color shelf stability may be increased by minimizing heating of the juice; thus, the juice may be added cold to the 200° F. cooked mixture, which immediately drops the temperature of the overall mixture by about 40° F. Calcium may be added as needed.

Once both peanut butter and jelly components have been staged for extrusion, the formation and packaging of the food slices begins. The product format—whether of the laminate or striped design, for example—is determined by the extrusion manifold. In the case of the laminate, it has been found to be easiest to begin extruding nut butter only for the initial process start-up. Once the extruder and packaging equipment are stabilized, the jelly stream is added via its extruder nozzle into the product. In the case of the striped format, each individual extruder nozzle is supplied by its own positive displacement pump. However, all of the nut butter nozzles and all of the jelly pumps may be supplied by a common hopper containing their respective food component. It has been found to be easiest to start the flow of product through all of the nozzles simultaneously and at a low initial rate. Once the continuous web of extruded/packaged product is running through the equipment, the desired ratio of components and individual slice weight may be adjusted.

The ratio of nut butter and jelly and the weight of the finished slice may be controlled manually on the pilot plant scale experimental equipment. For the laminate format, the preferred product design is approximately 50% (by volume) nut butter and 50% (by volume) jelly in the food slice, with a total slice weight of approximately 1.2 ounces. For the striped format, the ratio of peanut butter to jelly is more variable and is dependent upon the number of extruder nozzles for each component and the width of each individual stripe; however, the target slice weight is still approximately 1.2 ounces.

Actual extrusion parameters are subject to the production rate of the food slices. In general, the extrusion process conditions are such that the preferred line pressures at the extruder manifold range from approximately 25–60 psi for nut butter and 20–50 psi for jelly. Pressures are also subject to line diameter, product temperature (viscosity) and desired throughput rates.

During extrusion, film 34 passes over forming shoulder 58, as shown in FIG. 16, and may be longitudinally sealed using a heated bar, for example, as disclosed in the Meli '860 or '792 patents. Immediately following post-extrusion, longitudinal sealing of the film and flattening of the slice, the continuous web of product may be conveyed through a water-filled cooling bath. In practice, for the nut butter/jelly slice formation, the temperature of this bath has been approximately 60° F.; however, this is also dependent upon production rates. The temperature of the bath can be important because it causes the liquified fats in the nut butter to solidify and the hydrocolloids in the jelly to gel. As a result, the slice develops a certain "body" and rigidity which aids in later conveyance and packaging. Faster production rates necessitate a lower cooling bath temperature or more residence time in the bath to provide the same cooling effect and textural development. Of course, alternatively, cooling may follow cross-sealing.

After cooling and extrusion, the continuous web of product, in the preferred embodiment, may be conveyed through to and through a pre-crimp apparatus (e.g., belts with ribs, for example) which marks the web such that individual slices can be formed. In one preferred cross-sealer disclosed in the Meli '792 patent, the web continues through a series of heated sealing bars which serve to heat-seal and melt the sides of the plastic packaging film together in register with the previously formed pre-crimp demarcation. The temperature required for adequate sealing is dependent upon production rates, as this determines the amount of residence time the web has on the heated sealing bars and the amount of time available to form the seal. The temperature required is also dependent upon the type of packaging film employed. In practice, pilot plant experimental equipment has been run at nominal production rates with heater bar temperatures in the range of 280 to 320° F. After the cross-seals are formed, the slices may be cut on the seal such that the edges of neighboring slices remain sealed and yet exist as individual slices as opposed to a continuous ribbon. These individual slices may then be conveyed to machinery which counts/weighs the slices and stacks them in preparation for a packaging film over-wrap. Once the slices are so packaged, they can be further packaged into the desired container for shipping or storage.

Recent technology has been developed, using films with relatively low sealing temperatures, which seal without the use of external heat, but rather use the heat of the food product for sealing the film, as disclosed in pending U.S. Ser. No. 09/323,766, filed Jun. 1, 1999, titled "Product, Apparatus, And Film For Sealing Food Products Such As Processed Cheese Slices", hereby incorporated by reference. It is envisioned that this technology may also be used to make wrapped food portions according to the present invention.

Food portions such as food slices consisting of two or more different food items may also be provided using casting equipment, as now described. Such a process that could provide thin layers of nut butter upon jelly, or vice versa, could use a continuous cooling steel belt or drum. The food items could be fluidized through heating and then extruded upon the belt or drum with the aid of manifold orifices. The further flattening and shaping of the food item into a sheet could then be accomplished through the use of secondary rollers. It is also conceivable that two or more food items could be coextruded at roughly the same time upon such a surface to provide a multi-layered food sheet. The multi-layer item could then be cut after cooling when the product has achieved enough integrity to enable cutting and further conveyance for wrapping as either a single serving or as a multi-serving package typical of food service applications. Additionally, the food items could be coextruded upon a flexible film which is covering the continuous steel belt or drum. Having the food items already deposited upon the film would aid with further conveyance and wrapping.

There are drawbacks to casting methods, however. It has been shown through extensive historical work using process cheese that this casting method requires food items having more hardness and elasticity than food items useable with the coextruded method provided by the modified individual wrapping machines described above and in the Meli '792 or '860 patents, for example. For this reason, it is important that the layered food item attempt to closely approximate the textural and organoleptic attributes of the traditional food items. Experiments actually performed by the inventors show that harder and more elastic formulations than the nut butter and jelly described here are needed when tested within the current capabilities of existing casting equipment. Additionally, the casting method historically has a higher level of unsalable rejected product and therefore presents a higher percentage of the food items as a recycle issue.

A food portion, such as a food slice, made according to the present invention may be consumed at ambient room temperatures, and need not be frozen. The food slice, while at room temperatures, may also be readily, manually removed from its wrapper without compromising, or substantially compromising, its integrity, such as its texture and shape characteristics, and while retaining, or substantially retaining, same. Films of the type described here also provide non-stick surfaces which facilitate release of the food product. Of course, maintaining the food slice at refrigerated temperatures will obviously lengthen its shelf life.

To optimize release of the food portion from the packaging film, varying amounts of setting times following extrusion of the food portions may be preferred, depending upon the food item formulations used and processing techniques employed. However, food portions formulated and made according to the present invention are consumable immediately following extrusion, and no further mixing or cooking steps are necessary, though they may be employed.

It will be understood that the processing techniques described here for providing a food portion or food slice of nut butter and jelly may need to be modified if other food items are combined. However, the information provided here is believed sufficient to allow those of skill in the art to provide a variety of combined, packaged food products.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims

We claim:

1. A hot-fill process using a vertical form and fill machine for continuously preparing packaged, composite, cohesive food portions comprising at least nut butter and jelly wrapped in a flexible film, the process comprising the steps of:
   (a) simultaneously and separately pumping the nut butter and jelly to an extrusion location;
   (b) simultaneously and separately extruding the nut butter and jelly and longitudinally enclosing the extruded nut butter and jelly in a tubular web of the flexible film in the vertical form and fill machine;
   wherein sugar syrup is added to the nut butter just prior to extruding the nut butter and jelly;
   (c) combining the nut butter and jelly into composite predetermined food portions using a portion control method that varies an extrusion speed based on an amount of the nut butter and jelly present, wherein the nut butter and jelly within the predetermined food portions are in physical contact with each other; and
   (d) sealing the composite predetermined food portions within the flexible film;
   wherein a differential water activity of the nut butter and the jelly within the flexible film is less than about 0.5; and
   wherein the nut butter and jelly maintain their individual product identity in the flexible film and are cohesive and manually removeable as a composite from the flexible film.

2. The process of claim 1, wherein the water activity of at least one of the nut butter and jelly is modified in a predetermined manner by the addition of sugar.

3. The process of claim 1, wherein the composite predetermined food portions comprise food slices which are sufficiently cohesive to permit manual removal of the food slices from the sealed wrapper while retaining textural and shape characteristics of the slices.

4. The process of claim 1, wherein the composite predetermined food portions are hermetically sealed within their wrappers.

5. The process of claim 1 further comprising forming slices after sealing the composite predetermined food portions.

6. The process of claim 5, wherein forming slices comprises forming slices in which the hardness of the nut butter within the slices is in the range of about 0.25–4.0 Kg/cm² at 43EF.

7. The process of claim 5, wherein forming slices comprises forming slices in which the hardness of the jelly within the slices is in the range of about 0.25–4.0 Kg/cm² at 43EF.

8. The process of claim 1, wherein the jelly comprises first and second thickeners, the first thickener causing the jelly to have a viscosity of less than about 5,000 centipoise during its extrusion, and the second thickener causing the jelly to have a viscosity of greater than about 100,000 centipoise following extrusion of the jelly and after setting of the second thickener.

9. The process of claim 8, wherein at least one of the first and second thickeners comprises a gel.

10. The process of claim 1, wherein the water activity of the jelly is reduced by the addition of the sugar syrup.

11. The process of claim 1, wherein the water activity of the nut butter is increased by the addition of the sugar syrup.

12. The process of claim 1, wherein a hard fat is added to the nut butter.

13. The process of claim 1, wherein the nut butter comprises, by weight, about 50–90% peanut butter; about 1–40% peanut flour; about 0.5–5% stabilizer; about 0–10% sucrose; and about 0–2% salt.

14. The process of claim 13, wherein a nut component of the nut butter is created by combining nut flour with an edible oil.

15. The process of claim 1, wherein the nut butter comprises, by weight, about 40–85% peanut butter; about 0–10% peanut flour; about 0–10% maltodextrin; about 0–40% corn syrup; about 0.5 5.0% stabilizer; about 0.5–4.0% emulsifier; about 0.1–3.0% salt; about 0–35% fructose; about 0–20% dextrose; and about 0–40% water.

16. The process of claim 1, wherein the jelly comprises, by weight, about 5–20% fruit juice; about 0.5–5% high methoxyl pectin; about 0.5–5% low methoxyl pectin; about 0.1–3% acidulants; and about 0–2.5% vegetable oil.

17. The process of claim 1, wherein the jelly comprises, by weight, about 5–20% fruit juice; about 20–40% corn syrup; about 15–35% fructose; about 5–20% dextrose; about 0.25–4.0% konjac flour; about 0.05–2.0% carrageenan;

about 0.5–4.0% high methoxyl pectin; about 0.1–3.0% citric acid; and about 0–2.5% vegetable oil.

18. The process of claim 1, wherein sealing the composite predetermined food portions comprises forming food slices which are continuously sealed and wrapped at a rate in excess of 300 slices/minute at a single-lane machine.

19. The process of claim 18, wherein forming food slices comprises continuously sealing and wrapping at a rate in excess of 700 slices/minute.

20. The process of claim 18, wherein forming food slices comprises continuously sealing and wrapping at a rate in excess of 1,000 slices/minute.

21. The process of claim 1, wherein using a portion control method comprises using sensing mechanisms to maintain or regulate weights of the nut butter and jelly.

22. The process of claim 21, wherein using sensing mechanisms comprises using one or more of the following: mass flow meters, transducers and level sensors.

23. The process of claim 21, wherein using sensing mechanisms comprises using a bubble control device for controlling the amount of nut butter and jelly enclosed in the tubular web.

24. The process of claim 1, wherein using a portion control method comprises maintaining the amounts of the nut butter and jelly within the composite predetermined food portion within predetermined ratios.

25. The process of claim 1, further comprising the step of heating the nut butter and jelly into a soft, molten mass prior to their extrusion.

26. The process of claim 1, wherein combining the nut butter and jelly comprises orienting the nut butter and jelly in an alternating, generally stripe shaped pattern within the composite predetermined food portions.

27. The process of claim 1, further comprising providing a plurality of adjacent extrusion nozzles.

28. The process of claim 1, further comprising providing two or more concentric extrusion tubes for extruding the nut butter and jelly in a variegated format.

29. The process of claim 1, wherein sealing the composite predetermined food portions comprises forming food portions having a refrigerated shelf life of greater than about six months.

30. The process of claim 1, further comprising the step of cooling the composite predetermined food portions following extrusion.

31. The process of claim 1, further comprising the step of separately mixing ingredients for the nut butter and jelly prior to the simultaneously and separately pumping the nut butter and jelly.

32. The process of claim 1, wherein sealing the composite predetermined food portions comprises forming wrapped food portions in which one of the nut butter or jelly completely surrounds the other within the wrapped food portion.

33. The process of claim 1, wherein combining the nut butter and jelly into composite predetermined food portions comprises forming food portions that are consumable immediately following extrusion.

34. The process of claim 1, wherein using the portion control method comprises measuring the expansion or contraction of the tubular web of film that is caused by the amount of nut butter and jelly present within the tubular web.

35. The process of claim 34 further comprising using an electric motor controlled by a variable frequency drive to control the amount of nut butter and jelly introduced into the tubular web.

36. The process of claim 35 further comprising using a linear variable differential transformer, wherein motor speed changes depending upon a sensed voltage, the sensed voltage fluctuating with expansions or contractions in the tubular web.

37. The process of claim 1, wherein using a portion control method comprises adjusting the relative amount of the nut butter and jelly within the composite food portion.

38. The process of claim 1, further comprising the steps of cooling and then flattening the nut butter and jelly.

39. The process of claim 38, wherein cooling and flattening the nut butter and jelly occurs after the nut butter and jelly are enclosed within the tubular web.

40. The process of claim 38, wherein the cooling step comprises using, cooling water.

41. A hot fill process using a vertical form and fill machine for continuously preparing a packaged, composite food portion comprising at least nut butter and jelly wrapped in a flexible film, the process comprising the steps of:

(a) simultaneously and separately pumping the nut butter and jelly to an extrusion location, and simultaneously and separately extruding nut butter and jelly through two or more generally planar-shaped extrusion nozzles and combining them into a composite food portion;

wherein the nut butter and jelly within the composite food portion retain their individual product identity; and wherein sugar syrup is added to the nut butter just prior to extrusion;

(b) longitudinally wrapping the food portion in a tubular web of the flexible film using the vertical form and fill machine;

(c) forming the tubular web and the composite food portion into a slice shaped body using one or more flattening devices;

(d) briefly maintaining separation of the nut butter and jelly following extrusion and prior to forming the tubular web into the slice shaped body using one or more divider plates; and (e) sealing the slice shaped body within the flexible film such that the nut butter and jelly are in physical contact with each other to provide a laminate food slice;

wherein differential water activity of the nut butter and the jelly within the laminate food slice is less than about 0.5; and wherein the nut butter and the jelly maintain their individual product identity and are sufficiently cohesive to permit manual removal of the laminate food slice from the wrapper while substantially retaining textural and shape characteristics of the laminate food slice.

42. The process of claim 41, wherein the one or more divider plates comprise plates coated with a substance having a low coefficient of friction.

43. The process of claim 42, wherein the one or more divider plates comprise plates coated with Teflon®.

44. The process of claim 41, wherein combining the nut butter and jelly into a composite food portion using a portion control method comprises varing an extrusion speed based on an amount of the food portion present.

45. The process of claim 44, wherein using a portion control adjusting the relative amount of the nut butter and jelly within the composite food portion.

46. The process of claim 45, wherein using one or more divider plates comprises moving at least one of the one or more divider plates to permit an adjustment in the relative amount of the nut butter and jelly within the composite food portion.

47. A fluid fill process using a vertical form and fill machine for continuously preparing and packaging composite food portions comprising at least nut butter and jelly wrapped in a flexible film, the process comprising the steps of:
 (a) heating at least one of the nut butter and jelly to a soft, molten mass while maintaining at least one of the nut butter and jelly in a liquid state;
 (b) separately pumping each of the nut butter and jelly to an extrusion location;
 (c) adding sugar syrup to the nut butter just prior to extrusion;
 (d) extruding the nut butter and jelly and combining them into a composite food portion using a portion control method that varies an extrusion speed based on an amount of the food portion present, wherein the nut butter and jelly are in physical contact with each other yet maintain their individual product identity;
 (e) enclosing composite food portion within the flexible film using the vertical form and fill machine; and
 (f) hermetically sealing the nut butter and jelly within a package of the flexible film having hermetic longitudinal seals and a hermetic cross-seal,
 wherein the differential water activity of the nut butter and the jelly within the package is less than about 0.5 and the nut butter and the jelly are cohesive and manually removable from the package as a composite.

48. A process using a vertical form and fill machine for continuously preparing and packaging nut butter and jelly in a flexible film, the process comprising the steps of
 (a) separately heating and mixing each of the nut butter and jelly into liquefied mixtures, and adding sugar syrup to the nut butter;
 (b) separately delivering each of the liquefied nut butter and jelly to an extrusion location;
 (c) coextruding the nut butter and jelly so that each is combined into a predetermined, composite food portion using the vertical form and fill machine in which the nut butter and jelly are in physical contact with each other, using a portion control method that varies an extrusion speed based on an amount of the food portion present, while permitting the nut butter and jelly within the food portion to maintain their individual product identity,
 wherein the sugar syrup is added to the nut butter just prior to extrusion;
 (d) converting the food portion into generally slice-shaped food slices, wherein the food slices are sufficiently cohesive to permit manual removal of the food slices from the flexible film while substantially retaining their textural and shape characteristics of the composite food portion;
 (e) wrapping the food slices within the flexible film; and
 (f) sealing the food slices within the flexible film,
 wherein a differential water activity of the nut butter and the jelly within the flexible film is less than about 0.5 and the food slices are cohesive and manually removable from the flexible film as the composite food portion.

49. The process of claim 48, wherein sealing the food slices comprises hermetically sealing the food slices within the flexible film.

50. The process of claim 48, further comprising the step of adding sugar syrup to the nut butter prior to the extruding step but after substantial mixing has occurred.

51. The process of claim 48, wherein adding sugar syrup to the nut butter comprises adding corn syrup.

52. The process of claim 48 further comprising forming jelly including a gum to enhance gel formation of the jelly.

53. The process of claim 52, further comprising adding sugar to disperse the gum.

54. The process of claim 53, wherein adding sugar comprises adding sugar syrup.

55. A fluid fill process using a vertical form and fill machine for continuously preparing a composite food portion comprising nut butter and jelly in a flexible film, wherein the nut butter and jelly maintain their individual product identity, the process comprising the steps of:
 (a) preparing the nut butter and jelly;
 (b) separately delivering the nut butter and jelly to an extrusion location;
 (c) continuously coextruding the nut butter and jelly and combining them into a predetermined amount to form the composite food portion using a portion control method that varies the extrusion speed based on an amount of the composite food portion present, while permitting the nut butter and jelly within the composite food portion to maintain their individual product identity;
 wherein the sugar syrup is added to the nut butter just prior to extruding the nut butter and jelly;
 (d) briefly maintaining separation of the nut butter and jelly following extrusion using one or more divider plates; and
 (e) enclosing the composite food portion using the vertical form and fill machine, such that the nut butter and jelly are in physical contact with each other within the flexible film;
 wherein a differential water activity of the nut butter and the jelly within the flexible film is less than about 0.5; and
 (f) sealing the composite food portion within the flexible film;
 wherein the composite food portion is cohesive and manually removable from the flexible film as the composite food portion.

56. A fluid fill process using a vertical form and fill machine for continuously preparing composite food slices comprising nut butter and jelly wrapped in a flexible film, the process comprising the steps of:
 (a) separately preparing each of the nut butter and jelly into fluidic mixtures;
 (b) delivering the fluidic mixture of heated nut butter and jelly to an extrusion location;
 (c) continuously coextruding the nut butter and jelly;
 (e) adding sugar syrup to the nut butter just prior to the coextrusion step;
 (f) using the vertical form and fill machine, simultaneously filling the coextruded nut butter and jelly within a tubular web of the flexible film to form a composite food portion, forming the tubular web into a slice-shaped form, and longitudinally sealing the tubular web using one or more longitudinal sealing bars to form a hermetic longitudinal seal;
 (g) sealing the tubular web at cross sealing locations to form hermetic cross seals, wherein differential water activity of the nut butter and the jelly within the tubular web is less than about 0.5; and
 (h) cooling the tubular web either before or after cross-sealing of the tubular web to thereby provide hermetically sealed food slices wrapped and hermetically sealed within the flexible film, wherein the nut butter and jelly within the composite food slices maintain their individual product identity and are cohesive and manually removable from the flexible film as composite slices.

57. The process of claim 56, wherein continuously preparing composite food slices comprises preparing the food slices such that while at ambient room temperatures, the food slices have sufficient cohesiveness so that they can be manually removed from the flexible film while substantially retaining the textural and shape characteristics of a food slice.

58. The fluid fill process of claim 56, wherein adding sugar syrup comprises adding corn syrup.

* * * * *

UNITED STATES PATENT AND TRADEMARK OFFICE
CERTIFICATE OF CORRECTION

PATENT NO. : 7,060,311 B1
APPLICATION NO. : 09/609016
DATED : June 13, 2006
INVENTOR(S) : Franco X. Milani et al.

It is certified that error appears in the above-identified patent and that said Letters Patent is hereby corrected as shown below:

Col. 24, line 4, after "less than about" delete "0.5;" and substitute --0.5,-- in its place.

Column 26, line 15, immediately after "comprises using" delete "," comma.

Column 26, line 45, before "and" delete "0.5;" and substitute --0.5,-- in its place.

Column 28, in claim 55, line 30, after "film" delete ";" (semicolon) and substitute --,-- in its place.

Signed and Sealed this

Second Day of January, 2007

JON W. DUDAS
*Director of the United States Patent and Trademark Office*